US012283009B2

(12) United States Patent
Parfenov et al.

(10) Patent No.: US 12,283,009 B2
(45) Date of Patent: Apr. 22, 2025

(54) AUGMENTED REALITY SYSTEM

(71) Applicant: PTC Inc., Boston, MA (US)

(72) Inventors: Vladimir Parfenov, Hopkinton, MA (US); Kevin Elliott Jordan, Cape Elizabeth, ME (US); Steven Thomas Dertien, Holliston, MA (US); Moshe Jacob Baum, Carlisle, MA (US); Andre Gosselin, Montreal (CA); Stephen Prideaux-Ghee, Bristol (GB); James E. Heppelman, Needham, MA (US)

(73) Assignee: PTC Inc., Boston, MA (US)

( * ) Notice: Subject to any disclaimer, the term of this patent is extended or adjusted under 35 U.S.C. 154(b) by 0 days.

(21) Appl. No.: 18/378,899

(22) Filed: Oct. 11, 2023

(65) Prior Publication Data

US 2024/0037875 A1 Feb. 1, 2024

Related U.S. Application Data

(63) Continuation of application No. 17/944,796, filed on Sep. 14, 2022, now Pat. No. 11,810,260, which is a
(Continued)

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *G06F 9/453* (2018.02);
(Continued)

(58) Field of Classification Search
CPC ....... G06T 19/006; G06T 11/60; G06T 13/00; G06T 15/20; G06T 17/00; G06F 3/0482; G06F 9/453; G06F 40/169; G06F 3/011
See application file for complete search history.

(56) References Cited

U.S. PATENT DOCUMENTS 9,361,716 B1   6/2016  Erikson
9,754,413 B1   9/2017  Gray
(Continued)

FOREIGN PATENT DOCUMENTS

WO   2016064435 A1   4/2016
WO   20160064435     4/2016
(Continued)

OTHER PUBLICATIONS

Action and Response History in U.S. Appl. No. 17/944,796 (now U.S. Pat. No. 11,810,260).
(Continued)

*Primary Examiner* — Chong Wu
(74) *Attorney, Agent, or Firm* — ArentFox Schiff LLP

(57) ABSTRACT

An example augmented reality system includes: obtaining information about an instance of a device; recognizing the instance of the device based on the information; selecting a digital twin for the instance of the device, with the digital twin being unique to the instance of the device; and generating augmented reality content based on the digital twin and an actual graphic of the instance of the device.

20 Claims, 19 Drawing Sheets

Related U.S. Application Data continuation of application No. 17/146,589, filed on Jan. 12, 2021, now Pat. No. 11,461,981, which is a continuation of application No. 16/534,756, filed on Aug. 7, 2019, now Pat. No. 10,922,893, which is a continuation of application No. 15/146,398, filed on May 4, 2016, now Pat. No. 10,431,005.

(60) Provisional application No. 62/157,234, filed on May 5, 2015.

(51) Int. Cl.
| | | |
|---|---|---|
| *G06F 9/451* | (2018.01) | |
| *G06F 40/169* | (2020.01) | |
| *G06T 11/60* | (2006.01) | |
| *G06T 13/00* | (2011.01) | |
| *G06T 15/20* | (2011.01) | |
| *G06T 17/00* | (2006.01) | |

(52) U.S. Cl.
CPC ............ *G06F 40/169* (2020.01); *G06T 11/60* (2013.01); *G06T 13/00* (2013.01); *G06T 15/20* (2013.01); *G06T 17/00* (2013.01)

(56) References Cited

U.S. PATENT DOCUMENTS

| | | |
|---|---|---|
| 10,121,171 B1 | 11/2018 | Chang et al. |
| 10,305,734 B2 | 5/2019 | Dost et al. |
| 10,431,005 B2 | 10/2019 | Parfenov et al. |
| 10,572,716 B2 | 2/2020 | Prideaux-Ghee et al. |
| 10,755,480 B2 | 8/2020 | Prideaux-Ghee et al. |
| 10,922,893 B2 | 2/2021 | Parfenov et al. |
| 11,030,808 B2 | 6/2021 | Prideaux-Ghee et al. |
| 11,188,739 B2 | 11/2021 | Prideaux-Ghee et al. |
| 11,461,981 B2 | 10/2022 | Parfenov et al. |
| 11,810,260 B2 | 11/2023 | Parfenov et al. |
| 2004/0100556 A1 | 5/2004 | Stromme |
| 2011/0058187 A1 | 3/2011 | Smith et al. |
| 2012/0324213 A1 | 12/2012 | Ching et al. |
| 2012/0324313 A1 | 12/2012 | Ho et al. |
| 2013/0201185 A1 | 8/2013 | Kochi |
| 2014/0186002 A1 | 7/2014 | Hanaya et al. |
| 2014/0310595 A1 | 10/2014 | Acharya et al. |
| 2014/0333667 A1 | 11/2014 | Jung et al. |
| 2015/0029222 A1 | 1/2015 | Hofmann |
| 2015/0052479 A1 | 2/2015 | Ooi et al. |
| 2015/0074578 A1 | 3/2015 | Liang et al. |
| 2015/0170256 A1 | 6/2015 | Pettyjohn et al. |
| 2015/0332512 A1 | 11/2015 | Siddiqui et al. |
| 2016/0005211 A1 | 1/2016 | Sarkis et al. |
| 2016/0291922 A1 | 10/2016 | Montgomerie et al. |
| 2016/0328883 A1 | 11/2016 | Parfenov et al. |
| 2017/0068314 A1 | 3/2017 | Fu et al. |
| 2017/0344199 A1 | 11/2017 | Taguchi et al. |
| 2018/0025544 A1 | 1/2018 | Schoeller et al. |
| 2018/0158250 A1 | 6/2018 | Yamamoto et al. |
| 2018/0336729 A1 | 11/2018 | Prideaux-Ghee et al. |
| 2018/0341808 A1 | 11/2018 | Holzer et al. |
| 2018/0347988 A1 | 12/2018 | Marusco et al. |
| 2019/0120619 A1 | 4/2019 | Miura |
| 2019/0122027 A1 | 4/2019 | Prideaux-Ghee et al. |
| 2019/0122435 A1 | 4/2019 | Prideaux-Ghee et al. |
| 2022/0164502 A1* | 5/2022 | Pei ........................... G06N 5/02 |

FOREIGN PATENT DOCUMENTS

| | | |
|---|---|---|
| WO | 2016179248 A1 | 11/2016 |
| WO | 20160179248 | 11/2016 |
| WO | 2018213702 A1 | 11/2018 |
| WO | 20180213702 | 11/2018 |

OTHER PUBLICATIONS

Nicolai et al., "The Web of Augmented Physical Objects," Proc. ICBM, 2005, pp. 340-346.
Ong, S.K. et al., "Augmented Reality Aided Assembly Design and Planning," Annals of the CIRP, 56(1):49-52 (2007).
International Search Report for PCT/US2016/030720, 6 pages (Sep. 4, 2016).
Written Opinion for PCT/US2016/030720, 12 pages (Sep. 4, 2016).
Invitation to Pay Additional Fees and, Where Applicable, Protest Fee for PCT/US2016/030730, 7 pages (Jul. 11, 2016).
International Preliminary Report on Patentability for PCT/US2016/030720 (Augmented Reality System, filed May 4, 2016, issued by IB/WIPO, 15 pages (Nov. 16, 2017).
International Search Report for PCT/US2018/033385 (Augmented Reality System filed May 18, 2018), issued by ISA/EP, 4 pages (Jul. 25, 2018).
Written Opinion for PCT/US2018/033385 (Augmented Reality System filed May 18, 2018), issued by ISA/EP, 7 pages (Jul. 25, 2018).
Office Action for U.S. Appl. No. 15/789,329, 34 pages (Sep. 7, 2018).
Office Action for U.S. Appl. No. 15/789,341, 35 pages (Sep. 7, 2018).
Office Action for U.S. Appl. No. 15/789,316, 16 pages (May 23, 2019).
Office Action for U.S. Appl. No. 15/146,398, 24 pages (Oct. 4, 2018).
Final Office Action for U.S. Appl. No. 15/146,398, 24 pages (Mar. 21, 2018).
Office Action for U.S. Appl. No. 15/146,398, 23 pages (Aug. 25, 2017).
Office Action for U.S. Appl. No. 15/789,341, 22 pages (Sep. 19, 2019).
Office Action for U.S. Appl. No. 15/789,329, 25 pages (May 1, 2019).
Non-Final Office Action for U.S. Appl. No. 16/747,812, issued Apr. 19, 2021 (7 pages).
Notice of Allowance for U.S. Appl. No. 15/789,329, issued Feb. 5, 2021 (10 pages).
File History of U.S. Appl. No. 15/146,398, 195 pages.
International Preliminary Report on Patentability for PCT/US2016/030720 (Augmented Reality System, filed May 4, 2016), issued by IB/WIPO, 13 pages (Nov. 16, 2017).
International Search Report and Written Opinion for PCT/US2016/030720, 17 pages (Sep. 4, 2016).
International Search Report and Written Opinion for PCT/US2018/033385 (Augmented Reality System filed May 18, 2018), issued by ISA/EP, 3 pages (dated Jul. 25, 2018).
Nicolai et al., The web of augmented physical objects. Proceedings of the ICBM. 2005. 340-6.
Office Action for U.S. Appl. No. 15/146,398 issued Aug. 25, 2017 (19 pages).
Ong et al., Augmented reality aided assembly design and planning. Annals CIRP. 2007; 56(1): 49-52.
Final Office Action for U.S. Appl. No. 15/146,398 issued Mar. 21, 2018 (23 pages).
Office Action for U.S. Appl. No. 15/789,329, dated Sep. 7, 2018. (31 pages).
Office Action for U.S. Appl. No. 15/789,341, dated Sep. 7, 2018. (32 pages).
Office Action for U.S. Appl. No. 15/789,316, dated May 23, 2019 (9 pages).
Office Action for U.S. Appl. No. 15/146,398, dated Oct. 4, 2018 (23 pages).
Office Action for U.S. Appl. No. 15/789,341, dated Sep. 19, 2019 (20 pages).
Office Action for U.S. Appl. No. 15/789,329, dated May 1, 2019 (24 pages).
Final Office Action for U.S. Appl. No. 15/789,341, dated Mar. 8, 2019 (19 pages).

* cited by examiner

AUGMENTED REALITY SYSTEM

CROSS-REFERENCE TO RELATED APPLICATION

This application is a continuation of U.S. patent application Ser. No. 17/944,796, which was filed on Sep. 14, 2022, which is a continuation of U.S. patent application Ser. No. 17/146,589, which was filed on Jan. 12, 2021 and which issued as U.S. Pat. No. 11,461,981, which is a continuation of U.S. patent application Ser. No. 16/534,756, which was filed on Aug. 7, 2019 and which issued as U.S. Pat. No. 10,922,893, which is a continuation of U.S. patent application Ser. No. 15/146,398, which was filed on May 4, 2016 and which issued as U.S. Pat. No. 10,431,005. U.S. patent application Ser. No. 17/944,796, U.S. patent application Ser. No. 17/146,589. U.S. patent application Ser. No. 16/534,756, and U.S. patent application Ser. No. 15/146,398 are incorporated herein by reference. The benefit of priority also is hereby claimed to U.S. Provisional Application No. 62/157,234, entitled "Augmented Reality System", which was filed on May 5, 2015. U.S. Provisional Application No. 62/157,234 is incorporated herein by reference.

TECHNICAL FIELD

This specification relates generally to an augmented reality system.

BACKGROUND

Augmented reality (AR) is produced by superimposing computer-generated graphics onto real-world images or video.

SUMMARY

This specification describes examples of systems, methods, and apparatus, including computer program products, for generating AR content, and for using that AR content to improve the human-machine interaction.

An example process includes: generating a declarative model of a device, where the declarative model includes annotations defining attributes of the device; compiling the declarative model to produce a compiled model, where the compiled model includes the annotations; identifying a feature of the device based on an actual graphic of the device; linking information from the compiled model to the feature in the actual graphic of the device based on the annotations; generating augmented reality content based on the linked information from the compiled model and the feature in the actual graphic; and displaying the augmented reality content on a screen of a computing device. The linking operation may include: determining that the annotations describe the feature; and associating the information to the feature based on the comparison.

An example process includes: receiving an actual graphic of a device; and combining the actual graphic with computer graphics to generate augmented reality content for the device, where the computer graphics illustrate, through computer-generated animation, an action to be performed on the device. The example process may include running the computer-generated animation. The combining operation may include: locating, based on a digital twin for the device, a feature of the device on which the action is to be performed; locating the feature on the actual graphic; and superimposing the computer graphics over the actual graphic so that the feature on the computer graphics aligns to the feature on the actual graphic and remains aligned when the computer-generated animation is run. The digital twin may include data about the device in three dimensions. When run, the computer-generated animation may focus-in on the feature and presents the feature from different perspectives based on the data from the digital twin.

An example process includes: identifying a component of a device; generating, on-demand, a digital twin of part of the device proximate to the component, where the digital twin is generated based, at least in part, on sensor readings from the component and information about the device available from one or more sources, and where the digital twin includes information that models a structure and function of the part of the device and the component; generating augmented reality content for the part and the component based on at least one of the information in the digital twin or an actual graphic of the part and the component; and displaying the augmented reality content on a display device. The part of the device may be less than an entirety of the device, and the part of the device may be within a threshold distance of the component. All of the process may be performed on a mobile device. At least part of the process may be performed on a mobile device and at least part of the method may be performed on a computing device that is remote from the mobile device. Displaying may be performed on a mobile device. Operations for identifying the component, generating the digital twin, and generating the augmented reality content may be performed on a computing device that is remote from the mobile device.

An example process includes: obtaining information about an instance of a device; recognizing the instance of the device based on the information; selecting a digital twin for the instance of the device, with the digital twin being unique to the instance of the device; and generating augmented reality content based on the digital twin and an actual graphic of the instance of the device. The information may include one or more of: a Bluetooth address, a media access control (MAC) address, an Internet Protocol (IP) address, a serial number, a quick response (QR) code, a bar code, a radio frequency identifier (RFID), a subscriber identification module (SIM), a subnet address, or global positioning system (GPS) coordinates. Obtaining the information may include querying the device, querying one or more data sources containing the information, or querying both the device and the one or more data sources. Operations for obtaining the information may include recognizing distinctive attributes of the device based on an image of the device and based on stored information about the device.

An example process includes: recognizing an instance of a device; determining a position of a user relative to the instance of the device; selecting a digital twin for the instance of the device, where the digital twin is unique to the instance of the device; and generating augmented reality content based on the digital twin and an actual graphic of the instance of the device, where the augmented reality content is generated based also on the position of the user relative to the instance of the device. Generating the augmented reality content may include: determining the position of the user by determining a distance that the user is from the instance of the device; and including, in the augmented reality content, an amount of the device that is appropriate for the distance. In an example, the farther the user is away from the instance of the device, the more of the device is included in the augmented reality content. In an example, the amount of the device that is included in the augmented reality content changes as the distance changes. In an example, the amount varies between a maximum amount that comprises an entire view of the device and lesser amounts that comprise close-up views of one or more parts of the device.

An example process includes: recognizing an instance of a first device; recognizing an instance of a second device; determining that the first device and the second device are within a threshold proximity of each other; identifying, in response to the determining, a first digital twin for the first device and a second digital twin for the second device; following interaction of the first device and the second device, updating the first digital twin of the first device with information from the second digital twin of the second device, or updating the second digital twin of the second device with information from the first digital twin of the first device; generating augmented reality content based on at least one of the first digital twin or the second digital twin; and displaying the augmented reality content on a display device. At least one of the first device or the second device may be an intelligent device, and operations for at least one of updating the first digital twin or the second digital twin may be performed through direct device communication.

An example process includes: obtaining data representing an entity that is configurable; incorporating content into a graphical representation of the entity; manipulating the content within the graphical representation to produce a graphical representation of a configured entity; generating data representing the configured entity; incorporating the data into a digital twin for the configured entity; and enabling performance a simulation on the configured entity based on the digital twin. Information from the digital twin may be exported to a computer-based simulation system where the simulation is performed, results of the simulation may be received from the computer-based simulation system, and the results may be incorporated into the digital twin.

An example process includes: obtaining data from digital twins of multiple instances of a same type of device, where each digital twin is based, at least in part, on sensor readings from a corresponding instance of the device and information about the device available from one or more sources, and where each digital twin includes information that models a structure and function of each corresponding instance of the device; performing a simulation of a version of the device using the data, where the simulation provides an expected operation of the version of the device, and where the expected operation is predicted based, at least in part, on the data; and outputting results of the simulation for display on a computing device.

An example process includes: obtaining information about an instance of a device; recognizing the instance of the device based on the information; selecting a digital twin for the instance of the device, where the digital twin is unique to the instance of the device; determining, based at least in part on the digital twin, that there has been a change in at least one component of the instance of the device; updating a bill of materials for the device automatically using information from the digital twin to produce an updated bill of materials; and storing the updated bill of materials in computer memory. The example process may also include: identifying an order for the at least one component; determining that a technician bound for the instance of the device is in possession of the at least component; receiving confirmation that the at least one component has been changed in the instance of the device; and updating the digital twin to reflect a change in the at least one component.

An example process includes: receiving sensor readings from an instance of a device; generating a digital twin for the instance of the device based on the sensor readings and based on information about the structure and function of the device obtained from one or more sources; generating augmented reality content based on the digital twin and an actual graphic of the device; presenting the augmented reality content on a display device; updating the digital twin in real-time based at least in part on changes in the sensor readings to produce an updated digital twin; updating the augmented reality content in real-time based on the updated digital twin to produce updated augmented reality content; and presenting the updated augmented reality content in real-time on the display device. Generating the augmented reality content may include: identifying content of the actual graphic based at least in part on annotations relating to the actual graphic; querying the digital twin for the content; and superimposing computer graphics generated at least in part based on the digital twin over content in the actual graphic, where the computer graphics are superimposed based on locations of the content in the actual graphic.

An example process includes: obtaining information about an instance of a device; recognizing the instance of the device based on the information; selecting a digital twin for the instance of the device, where the digital twin is unique to the instance of the device; generating augmented reality content based on the digital twin and an actual graphic of the instance of the device, where the augmented reality content includes computer graphics representing one or more virtual controls for the device; associating the one or more virtual controls with one or more corresponding actual controls on the device that are remotely accessible; receiving data indicating that one or more of the virtual controls have been selected on a screen of a computing device; and in response to receipt of the data, remotely activating one or more of the actual controls that corresponds to one of more of the virtual controls that have been selected. The one or more virtual controls may be part of a control panel that is represented by the computer graphics. The control panel may represent a physical control panel on the device. The control panel may include a computer-generated construct representing actual controls on the device that differs from a physical organization of the controls on the device.

An example process includes: obtaining sensor readings from an instance of a device over a period of time; generating a digital twin for the instance of the device based on the sensor readings and based on information about the device obtained from one or more sources, where the digital twin maintains a record of the sensor readings over the period of time and corresponding operation of the device over the period of time; and diagnosing a problem associated with the device based on data from the digital twin. The sensor readings may include environmental readings. Diagnosing the problem may include: generating augmented reality content for the device based on the digital twin and an actual graphic of the device, where the augmented reality content includes video showing performance of the device over the period of time, and where the video includes computer graphics showing the environmental readings and showing a component of the device having the problem; and analyzing the augmented reality content to diagnose the problem.

An example process includes: generating data for a graphical user interface (UI), where the GUI is configured to display augmented reality content, and where the GUI includes tools for interacting with displayed augmented reality content; outputting the data for display on a screen of a computing device; receiving input from one or more of the tools of the GUI, where the input is for affecting the augmented reality content; updating a digital twin of a device that is a subject of the displayed augmented reality content based on the input, where the digital twin includes information that models a structure and function of the device; and updating displayed augmented reality content based on one or more updates to the digital twin. The input may include mark-ups or text added to the displayed augmented reality content. The input may include instructions to generate, and to display, one or more widgets with the augmented reality content, where the one or more widgets are interactive to obtain information from sensors associated with the device. The example process may include publishing updated augmented reality content to social media.

An example process includes: receiving sensor readings from one or more physical sensors on an instance of a device; generating one or more virtual sensor readings based on the sensor readings from the one or more physical sensors; generating a digital twin for the instance of the device based on the sensor readings and the virtual sensor readings, where the digital twin also is based on information about the structure and function of the device obtained from one or more sources; generating augmented reality content based on the digital twin and an actual graphic of the device, where the augmented reality content includes readings from the virtual sensors or graphical depictions of the virtual sensors; and outputting data to produce a display on a screen of a computing device, with the data representing the augmented reality content. Operations for generating the virtual sensor readings may include determining a value for a physical quantity that is different from physical quantities sensed by the one or more physical sensors.

An example method performed by one or more processing devices includes: generating, by the one or more processing devices, a declarative model of a device, with the declarative model comprising annotations defining attributes of the device; compiling, by the one or more processing devices, the declarative model to produce a compiled model, with the compiled model comprising the annotations; identifying, by the one or more processing devices, a feature of the device based on an actual graphic of the device; linking, by the one or more processing devices, information from the compiled model to the feature in the actual graphic of the device based on the annotations; generating, by the one or more processing devices, augmented reality content based on the linked information from the compiled model and the feature in the actual graphic; and generating and outputting data to display the augmented reality content on a screen of a computing device. The example method may include one or more of the following features, either alone or in combination.

Linking may include determining that the annotations describe the feature; and associating the information to the feature may be based on the determining. The augmented reality content may include computer graphics, with the computer graphics illustrating, through computer-generated animation, an action to be performed on the device. The computer graphics may be superimposed over the actual graphic so that a feature of the computer graphics aligns to the feature on the actual graphic and remains aligned when the computer-generated animation is run. When run, the computer-generated animation focuses-in on the feature and presents the feature from different perspectives based on the linked information from the compiled model. Displaying may be performed on a mobile device, and generating the declarative model, compiling, identifying, linking, and generating the augmented reality content may be performed on a computing device that is remote from the mobile device.

The device may be an instance of a general device and the compiled model may define a digital twin of the instance, with the instance being a unique example of the general device that is differentiated from other instances of the general device. Generating the augmented reality content may include: obtaining information about the instance; recognizing the instance based on the information about the instance; and selecting the digital twin of the instance for generation of the augmented reality content. The information about the instance may include one or more of: a Bluetooth address, a media access control (MAC) address, an Internet Protocol (IP) address, a serial number, a quick response (QR) code, a bar code, a radio frequency identifier (RFID), a subscriber identification module (SIM), a subnet address, or global positioning system (GPS) coordinates. Obtaining the information may include: querying the device, querying one or more data sources containing the information about the instance, or querying both the device and the one or more data sources; or recognizing distinctive attributes of the device based on an image of the device and based on stored information about the device.

The device may be an instance of a general device and the compiled model may define a digital twin of the instance. The example method may include determining, based at least in part on the digital twin, that there has been a change in at least one component of the instance; updating a bill of materials for the device automatically using information from the digital twin to produce an updated bill of materials; and storing the updated bill of materials in computer memory. The device may be an instance of a general device and the compiled model may define a digital twin of the instance. The digital twin may be based on sensor readings obtained from sensors on the device and may be based on information about the structure and function of the device obtained from one or more sources. The example method may include: updating the digital twin in real-time based at least in part on changes in the sensor readings to produce an updated digital twin; updating the augmented reality content in real-time based on the updated digital twin to produce updated augmented reality content; and presenting the updated augmented reality content in real-time on the display device.

An example method performed by one or more processing devices may include recognizing, by the one or more processing devices, an instance of a device; determining, by the one or more processing devices, a position of a user relative to the instance of the device; selecting, by the one or more processing devices, a digital twin for the instance of the device, with the digital twin being unique to the instance of the device; and generating, by the one or more processing devices, augmented reality content based on the digital twin and an actual graphic of the instance of the device, with the augmented reality content being generated based also on the position of the user relative to the instance of the device. The example method may include one or more of the following features, either alone or in combination.

Generating the augmented reality content may include determining the position of the user by determining a distance that the user is from the instance of the device; and including, in the augmented reality content, an amount of the device that is appropriate for the distance. The farther the user is away from the instance of the device, the more of the device may be included in the augmented reality content. The amount of the device that is included in the augmented reality content may change as the distance changes. The amount may vary between a maximum amount that comprises an entire view of the device and lesser amounts that comprise close-up views of one or more parts of the device.

An example method performed by one or more processing devices may include receiving, at the one or more processing devices, sensor readings from one or more physical sensors on an instance of a device; generating, by the one or more processing devices, one or more virtual sensor readings based on the sensor readings from the one or more physical sensors; generating, by the one or more processing devices, a digital twin for the instance of the device based on the sensor readings and the virtual sensor readings, with the digital twin also being based on information about the structure and function of the device obtained from one or more sources; generating, by the one or more processing devices, augmented reality content based on the digital twin and an actual graphic of the device, with the augmented reality content comprising readings from the virtual sensors or graphical depictions of the virtual sensors; and generating data for display on a screen of a computing device, with the data representing the augmented reality content. The example method may include one or more of the following features, either alone or in combination.

Generating the virtual sensor readings may include determining a value for a physical quantity that is different from physical quantities sensed by the one or more physical sensors. The digital twin may maintain a record of the sensor readings over the period of time and corresponding operation of the device over the period of time. The example method may include diagnosing a problem associated with the device based on data from the digital twin. The augmented reality content may include one or more virtual controls with one or more corresponding actual controls on the device that are remotely accessible. The example method may include receiving data indicating that one or more of the virtual controls have been selected on a screen of a computing device; and in response to receipt of the data, remotely activating one or more of the actual controls that corresponds to one of more of the virtual controls that have been selected.

Any two or more of the features described in this specification, including in this summary section, may be combined to form embodiments not specifically described in this specification.

All or part of the methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of an augmented reality (AR) system. In some examples, AR includes superimposing computer graphics onto real-world image or video (referred to herein as "actual graphics"). AR content thus includes actual graphics of a device, system, or other entity augmented with computer graphics, such as imagery, animation (video), text, or the like.

Figure 1:
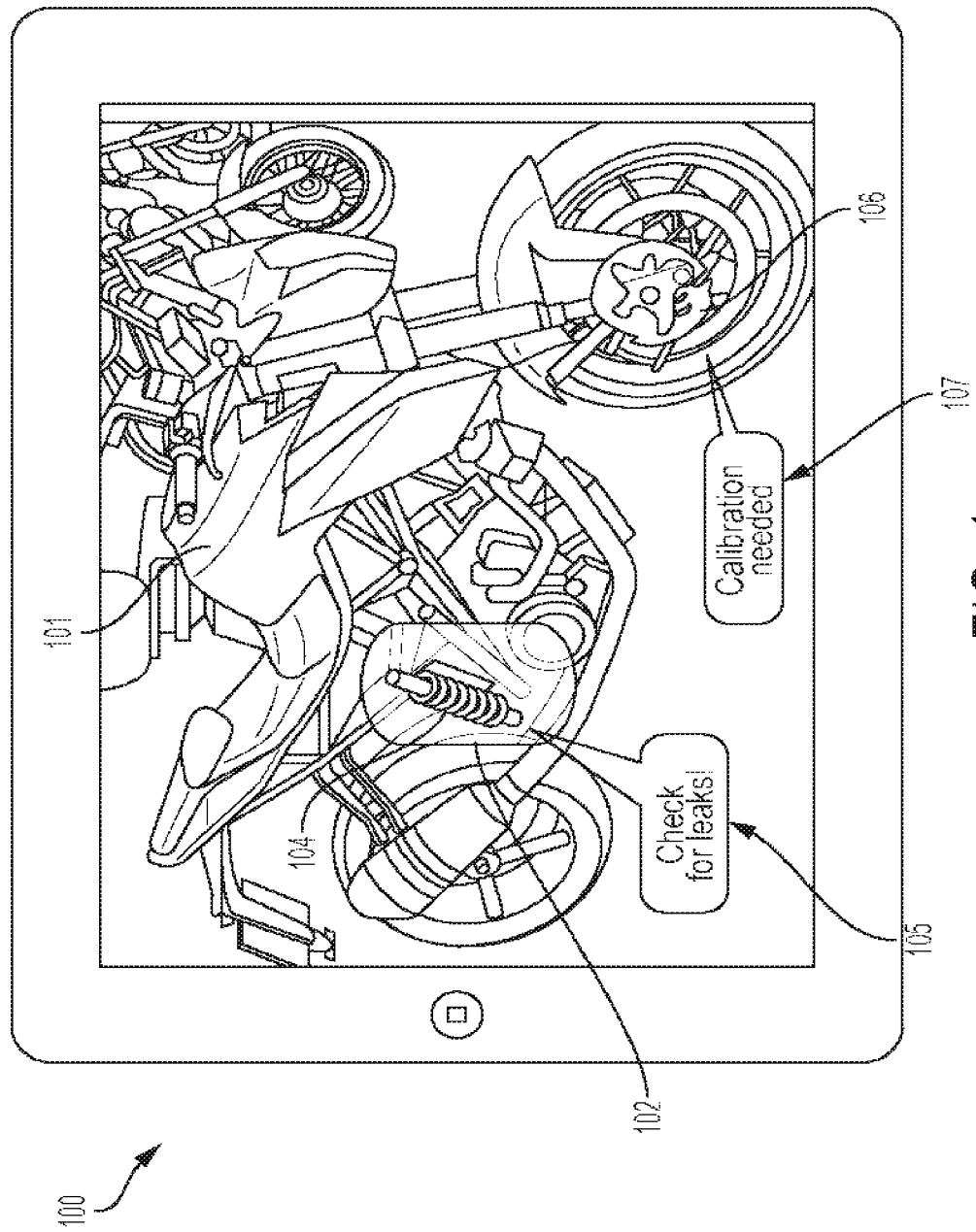
FIG. 1 is an image of a display screen showing AR content.

FIG. 1 shows a display of a tablet computing device, which includes AR content 100. In this example, AR content 100 includes an actual graphic of a motorcycle 101 and computer graphics 102 that are rendered at appropriate locations over the actual graphic. The actual graphic is typically captured via a camera or other appropriate imaging device. The computer graphics are generated by a computing device, such as a server or tablet computing device, based on information about the device displayed, in this case, the motorcycle. The computer graphics may relate to the device in some way, and may include images, video, text, or any other appropriate information. In the example of FIG. 1, the computer graphics includes images showing the inner architecture of motorcycle 101, and textual instructions about actions that should be taken with respect to a particular part highlighted relative to the rest of the architecture. In image 104, the part is a shock absorber, and the action 105 is to "Check for leaks". In image 106, the part is a front wheel brake, and the action 107 is "Calibration needed". The actions to be taken may be based on readings from sensors placed on the actual device and/or based on service history data feed alerts from a server for identified objects.

Figure 32:
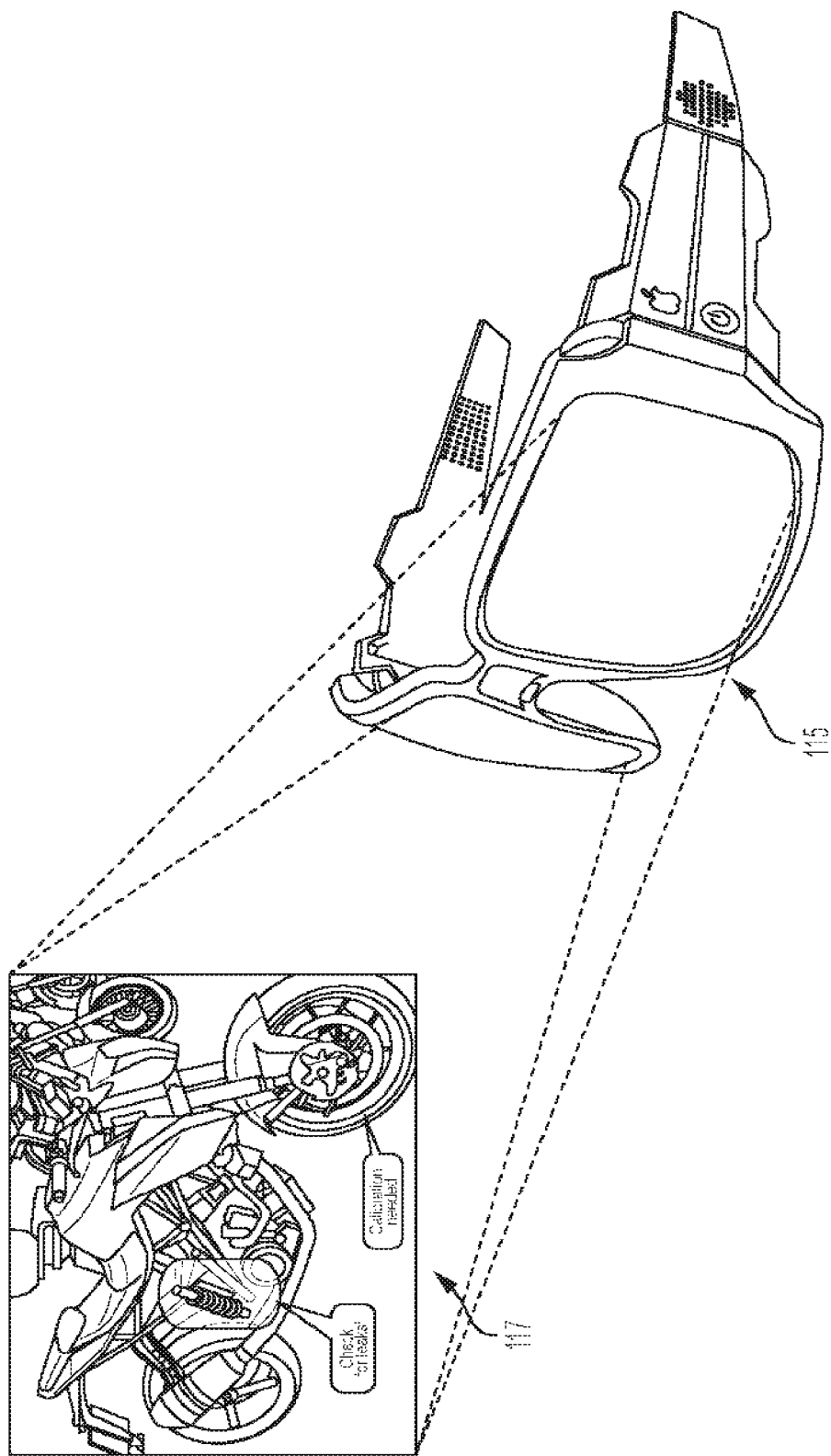
FIG. 32 is a perspective view of digital AR glasses and the AR content displayed thereon and viewable by a user.

FIG. 32 shows an example of digital glasses 115 that may be used to display AR content 117. In this example AR content 117 is the same as AR content 100 of FIG. 1. AR content 117 includes content that a viewer wearing digital glasses 115 sees through the lenses of the digital glasses when wearing the digital glasses. The AR content may be generated by a computing device in communication with the digital glasses or by one or more processing devices on-board the digital glasses. As explained herein, the AR content may be generated based on information about the device displayed, in this case, the motorcycle. In the example of digital glasses, the real-world content (actual graphic) is transmitted through the lenses of the digital glasses and directly to the user's eye, as is the case with any glasses. The AR content, in this example, includes the computer-generated graphics, which are computer-generated and displayed on the inside of the lens to augment what the user is already viewing, thereby resulting in AR content 117. The actual graphic, however, may be captured by the digital glasses, or a camera thereof, and processed in real-time as described herein to position the computer graphics at appropriate locations on real-world scenes that the user is viewing.

Although a tablet computing device and digital glasses have been shown thus far, AR content of the type described herein may be generated on, and displayed on, any appropriate computing device and/or display screen.

Each instance of a device, such as motorcycle 101, may also have a digital twin (DT). A DT includes a computer-generated representation of information and parameters (e.g., characteristics) representing the physical device (the Physical Twin or PT) or portions thereof. The DT can be generated by a computing device by binding information and parameters about physical devices to digital information describing those same devices. The information and parameters may originate from, and/or be managed by, systems such as, but not limited to, PLM (product lifecycle management), CAD (computer-aided design), SLM (service level management), ALM (application lifecycle management), CPM (connected product management), ERP (enterprise resource planning), CRM (customer relationship management), and/or EAM (enterprise asset management). The information and parameters can cover a range of characteristics stored, e.g., in a bill of material (BOM) associated with the device (e.g., EBOM—engineering BOM, MBOM—manufacturing BOM, or SBOM—service BOM), the device's service data and manuals, the device's behavior under various conditions, the device's relationship to other device(s) and artifacts connected to the device, and software that manages, monitors, and/or calculates the device's conditions and operations in different operating environments. A DT, like its corresponding PT, may have a lifecycle that can be managed as the DT progresses through various stages. A DT can be generated, modified, instantiated, published, connected, and analyzed; can become intelligent; and can mature, retire, and cease to exist.

In some implementations, a DT can be generated at the time that the PT is manufactured, but before the PT becomes has a network connection (for PTs that are capable of network connection). For example, the AR system may obtain information indicating that a washing machine having a given configuration and a given serial number has been manufactured. The AR system may create, or tag, a DT for the washing machine based on information such as that described herein. Operational information about the instance washing machine, in this example may not be available prior its use; however, that information can be incorporated into the DT as the information is obtained. The DT may be linked to a device, such as the washing machine, after the device is identified or connected to a network.

An instance of a device (or "device instance") includes a unique example of a general device that is differentiated from other devices, including those of like type. For example, a motorcycle may have a vehicle identification (ID) number that distinguishes it from all other motorcycles, including those that are the same make and model. As described herein, different types of information may be used to identify the instance of a device. A DT is specific to a device instance. For example, there may be a single DT for each corresponding device instance. In this context, a device is not limited to an individual article, but rather includes any appropriate apparatus, system, software, structure or other entity that can be modeled.

A device's DT is generated based on design data, manufacturing data, and/or any other appropriate information (e.g., product specifications) about the device, which may be generic to all such devices. The DT is also generated based on sensor data that is obtained for the particular instance of the device. In the motorcycle example of FIG. 1, the DT may be generated using data that describes the structure and function of the motorcycle. This data may be obtained from any appropriate public or private database, such as product specifications. The structure and function are common to all motorcycles having the same make, model, etc. as motorcycle 101. The DT, however, is also generated based on sensor data, which may be obtained from readings taken from sensors placed on, or near, the instance of the device (e.g., motorcycle 101). Since that sensor data is unique to motorcycle 101, the DT for motorcycle 101 will be unique relative to DTs for other motorcycles, including those that are identical in structure and function.

Figure 2:
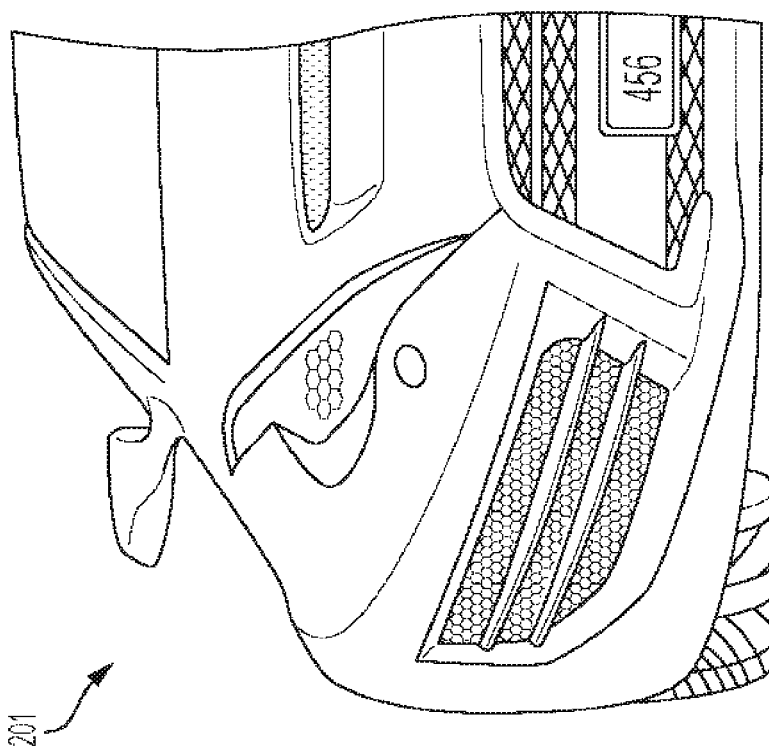
FIG. 2 shows an image of part of an automobile and a computer graphic generated based on a digital twin of the automobile.
Figure 2:
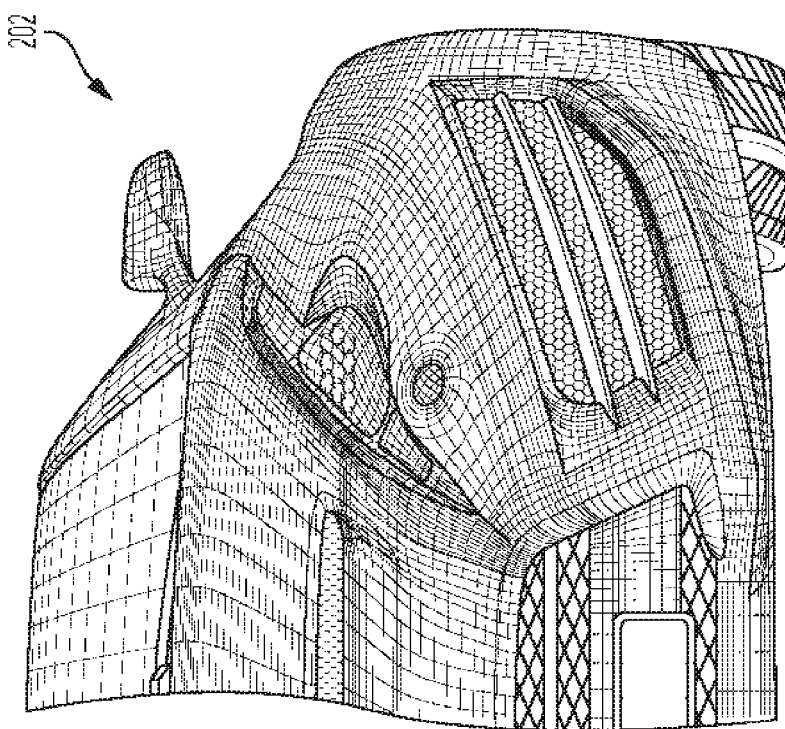
Figure 3:
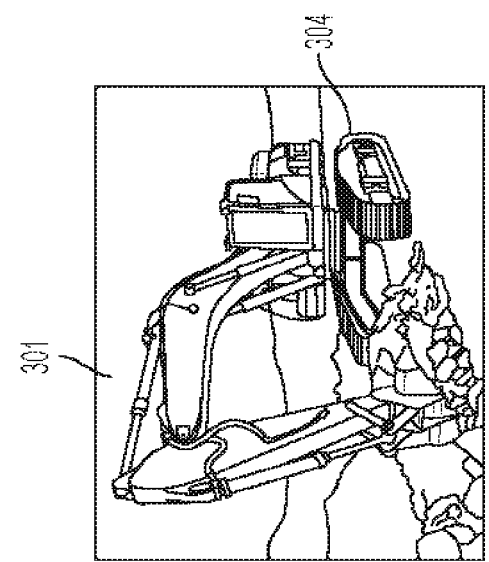
FIG. 3 shows an instance of an excavator and a computer graphic generated based on a digital twin of the excavator.
Figure 3:
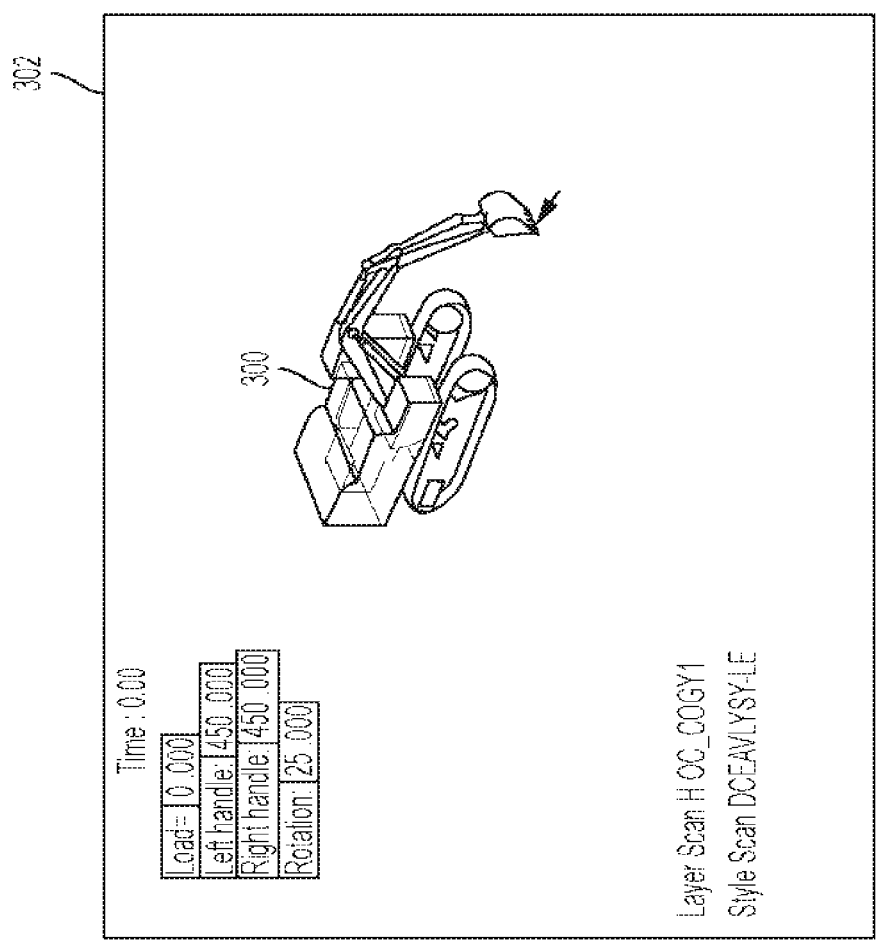

FIG. 2 shows an example of an actual graphic 201 of part of a car and a three-dimensional (3D) graphical model 202 generated from the car's DT. The model may be generated using computer software, such as a CAD tool, and may be rendered on the display of any appropriate computing device. FIG. 3 shows a model 300 based on a DT of an excavator 301 rendered on a display 302 of a desktop computer. As noted, the DT is created based, in part, on sensor data. Sensors may be placed at different locations interior and/or exterior to a device instance (e.g., motorcycle 101, car 201, excavator 301). Sensor readings are obtained from those sensors, and are processed by a computing device to identify information about the device, such as its operational characteristics, environment, and the like. This information is incorporated into the DT for that device, resulting in a DT representing an operation and status that reflects that operation and status of the actual device instance. For example, in the case of excavator 301, model 300 may simulate, on-screen, operation and status of the excavator 301 and may be used to generate additional information using virtual sensing (described herein), such as calculated force reactions on mechanism joints. The operation may be represented, on-screen, by computer animation depicting the motion of the excavator. The status may include, for example, the state of various parts on the excavator, such as the amount of wear of the tread on tracks 304. Generally, any information that can be obtained from, or derived from, sensor readings on an actual device instance can be incorporated into the DT for that device instance.

The DT for a device instance may have numerous uses including, but not limited to, generating AR content for the device. For example, the example AR system described herein may superimpose computer graphics that are based on, or represents, the DT or portions thereof onto an actual graphic of a device instance. Example processes performed by the example AR system identify an instance of a device, generate AR content for the device using the DT for that device, and use that AR content in various ways to facilitate human-machine interaction with the device, including real-life, real-time interaction between the user and the device. Additional processes performed by the example AR system are also disclosed.

Figure 4:
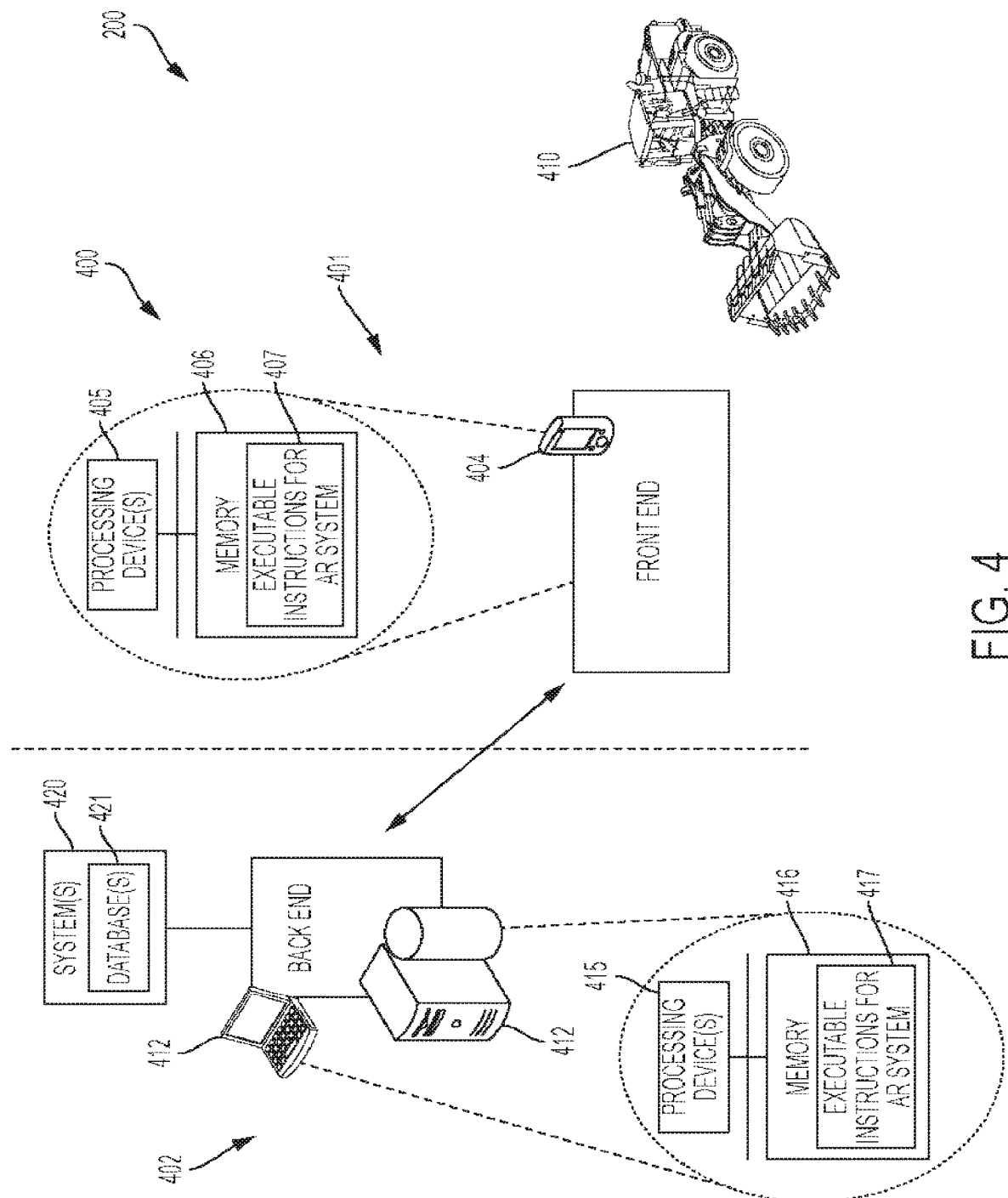
FIG. 4 is a block diagram of an example architecture on which the AR system described herein may be implemented.

FIG. 4 shows an example architecture 400 on which the AR system, and its processes described herein, may be implemented. The AR system, however, is not limited to use with this architecture, and may be implemented on any appropriate architecture.

In FIG. 4, AR system 400 includes a front end 401 and a back end 402. Front end 401 includes one or more mobile computing devices (or simply, mobile devices). A mobile device may include any appropriate device capable of displaying digital imagery including, but not limited to, digital (AR) glasses, a smartphone, a digital camera, a tablet computing device, and so forth. A mobile device 404 may include one or more processing devices 405 (e.g., microprocessors) and memory 406 storing instructions 407 that are executable by the one or more processing devices. The instructions are part of one or more computer programs that are used to implement at least part of the AR system. For example, the instructions may be part of an application (or "app") that performs operations including, for example, displaying AR content to a user. Mobile device 404 also includes one or more sensing mechanisms, such as a camera for capturing actual graphics, such as real-world images and video. Mobile device 404 may also be connected to, and accessible over, a wireless network, such as a long term evolution (LTE) network or a Wi-Fi network.

The subject 410 of AR content may be any appropriate device, examples of which are described herein. Such devices may be intelligent or not. Intelligent devices typically include one or more embedded processing devices (e.g., microprocessors, embedded controllers, or the like) and memory storing instructions that are executable by the one or more processing devices. The instructions may be part of one or more computer programs that are used to implement device-specific control and communication functions. Intelligent devices may also be connected to, and accessible over, a wireless network.

Back end 402 includes one or more computing devices 412, examples of which include servers, desktop computers, and mobile devices. A back end computing device includes one or more processing devices 415 (e.g., microprocessors) and memory 416 storing instructions 417 that are executable by the one or more processing devices. The instructions are part of one or more computer programs that are used to implement at least part of the AR system. For example, the instructions may be part of a computer program to generate DTs, to analyze DT content, to communicate with other systems 420 and databases 421 containing device information, and so forth. A back end computing device may also be connected to, and accessible over, a wired or wireless network. In some implementations, the AR system may not include the back end 402, but rather may be implemented solely on the front end.

Front end 401 and back end 402 may communicate with each other, and with other systems, such as those described herein, over one or more computer networks, which may include wireless and/or wired networks.

Figure 5:
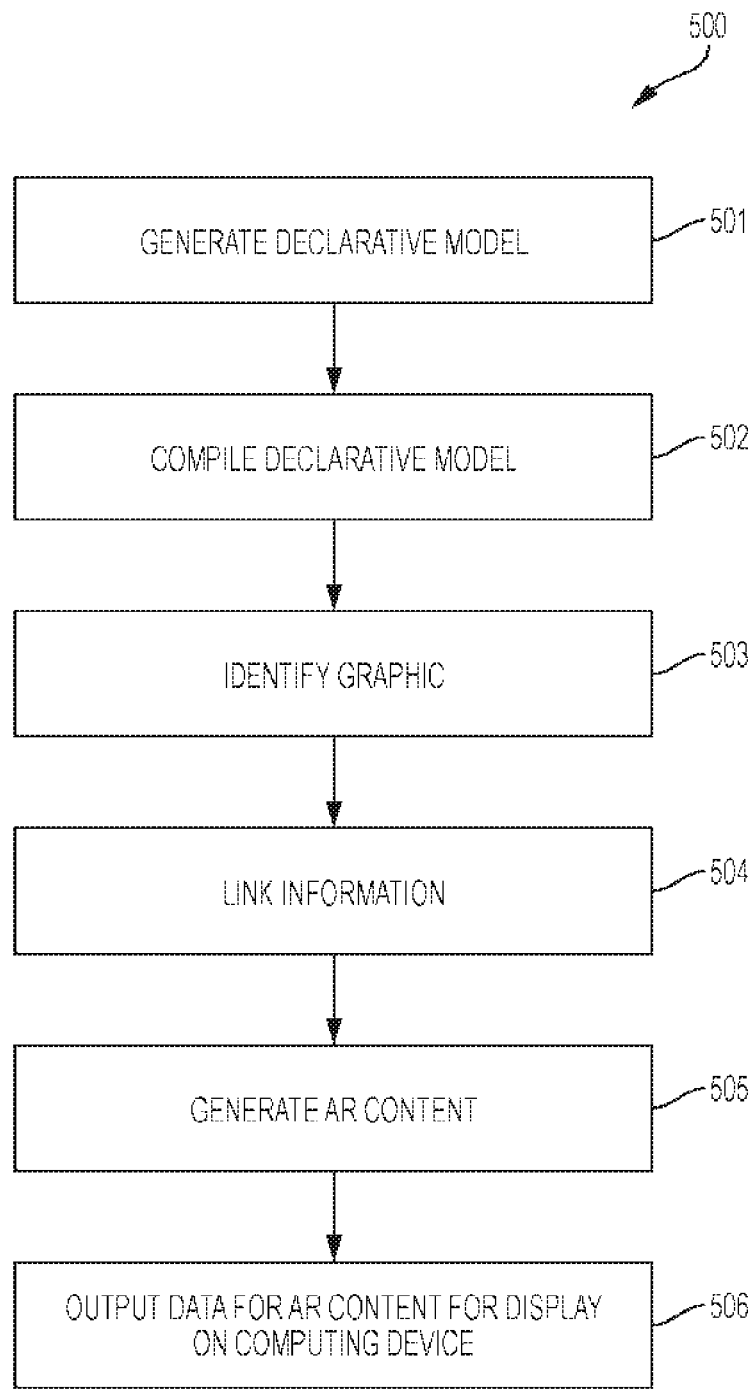
FIG. 5 is a flowchart showing an example process for generating AR content.

Referring to FIG. 5, in an example process 500 to produce AR content, a declarative model is generated (501) for a device. The declarative model is generated in computer code, and is compiled (502) to produce a compiled model comprised of intermediate object code that can be read by an AR player. The declarative model, and thus the compiled model, defines the DT, or at least a part of the DT, for the device. In this example, the AR player is executed on the front-end of the AR system, and comprises computer code that is executable to generate AR content based on the compiled model and on an actual graphic of the device. Any appropriate declarative computing language may be used to generate the declarative model based on information available about the device, such as product specifications or other information.

Annotations may be incorporated into the computer code to describe features of the device in the declarative model. In this regard, an annotation may include semantic data that is stored in association with actual design data. In some examples, a graphical model of a device may be annotated to identify, among other things, features and attributes of the device. The model may be annotated to identify locations and functions of features of the device. The annotations may include attributes of those features, such as size, shape, color, etc. Any appropriate techniques may be used to annotate the model. For example, metadata may be associated with specific features in the model. In some implementations, a look-up table (LUT) or other appropriate construct may be used to associate coordinates of the model with corresponding annotations.

In some implementations, the annotations may be computer generated. For example, a computer program may associate annotations with the model based on information about the model obtained from any appropriate source(s). For example, the computer program may store the annotations along with objects in the model or otherwise associate the two using look-up table(s) (LUTs) or other constructs. In some implementations, the annotations may be incorporated manually. For example, users may enter the annotations into a graphic user interface (GUI), and a computer program may associate the annotations with objects in the model. In some implementations, the annotations may be generated using a combination of manual entry and computer-automated techniques. For example, a user may be prompted to manually confirm the result of annotations assigned by the computer to elements of a model.

Figure 6:
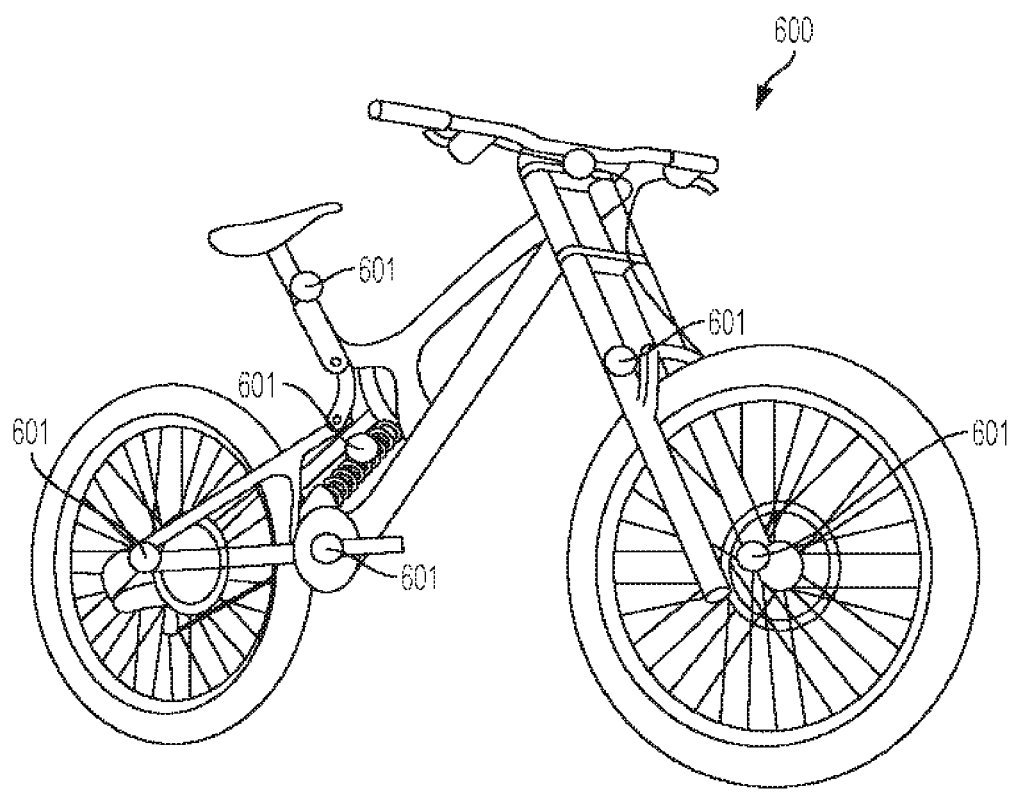
FIG. 6 is an image of an instance of a bicycle and its sensors.

Take bicycle 600 of FIG. 6 as an example. In this case, the declarative model includes computer code and annotations that identifies parts of the bicycle, such as its wheels, frame, handlebars, and seat. The declarative model may also include computer code an annotations describing attributes of each of these parts, where attributes includes any appropriate descriptive information. The computer code and annotations may also define attributes of the bicycle as a whole, such as its height, weight, wheel base, color, etc. The declarative model may define the interconnection and function of each of the parts of a device. In the bicycle example, the declarative model may specify that both the back wheel and pedals are connected to a sprocket, and that movement of the pedals causes movement of the sprocket, resulting in movement of the back wheel. The declarative model also includes the locations, identities, and functions of sensors 601 on the device.

In this regard, sensors are deployed at appropriate locations on an actual device instance (e.g., a PT), such as bicycle 600 in FIG. 6. The types of sensors deployed may vary depending upon the physical quantity to measure. The sensors sense physical quantities and provide information (e.g., data) about those physical quantities to a computing device, in some cases, in real-time. For example, pressure sensors may be used on the bicycle axles to identify the amount of force applied thereto during use. The computing device may be any appropriate device, such as a smartphone, table, server, and the like. The information may be provided wirelessly directly to the computing device or over any appropriate computer network.

Each sensor 601 may be tagged and uniquely identifiable, e.g., based on a unique identifier associated therewith that is transmitted along with sensor readings. Information from the sensors is received by the computing device, and is incorporated into the declarative model defining the architecture of the device. For example, the declarative model may include that front and back sensors are positioned at the front and back wheels, respectively, and that those sensors each records a number of rotations-per-minute (RPM) and/or a force applied to each wheel in appropriate units. For example, the declarative model may also indicate the distance between sensors or between features of the device and various sensors. Sensors may be deployed at any appropriate locations interior to, or exterior to, a device, and may be used to sense any appropriate physical quantity. For example, in complex machinery, such as an automobile, sensors may be place on the wheel exteriors, on the seats, on various parts of the automobile engine, on the axle, and so forth. Generally, any appropriate information obtained through, or derived from, sensor readings may be incorporated into the declarative model.

In general, the declarative model may define distances between any appropriate features or physical properties of a device, or even other relationships such as a process that would exist between any two given sensors if that process is applied at the declarative model level.

As indicated above, the declarative model is compiled (502) to produce a compiled model that is readable by, and understandable by, the AR player. The AR player may generate AR content based on the compiled model and based on annotations in the compiled model representing the actual device.

To generate AR content for a device, the AR system links (504) information from the compiled model to corresponding information in the actual graphic of the device, and generates (505) AR content based on the linked information. The AR system outputs (506) data representing the AR content for display on a display screen of a computing device, such as a tablet computing device. By way of example, the AR player may identify objects and their attributes in the actual graphic using object recognition techniques or other appropriate processes. For example, in the bicycle case, the AR player may detect a round object having a particular radius and a black color. The compiled model may be read to locate a feature of the device that has the same attributes as the identified feature. The attributes may be specified in annotations in the model. After such a feature is identified in the compiled model, the AR system determines that two are the same feature. Any appropriate number of attributes may be used to correlate features from the actual graphic to features in the compiled model. In the example provided above, the AR system may determine that the round object having a particular radius and a black color is a front wheel of the bicycle. When that determination is made, the AR system links the information from the compiled model to the feature shown in the actual graphic. For example, the compiled model may contain information describing the make, model, tread, and so forth of the tire. The compiled model may also contain sensor readings, or other information. That information is then linked to the tire in the actual graphic, and used to generate AR content.

The AR player may generate AR content by rendering computer graphics generated from data in the DT over appropriate locations of the actual graphic. For example, the AR player may identify an element of a graphic in the manner described above, obtain information about that graphic from the annotations and/or other information available in the compiled model, and generate the graphic based on information from the compiled model and/or sensor readings.

Figure 7:
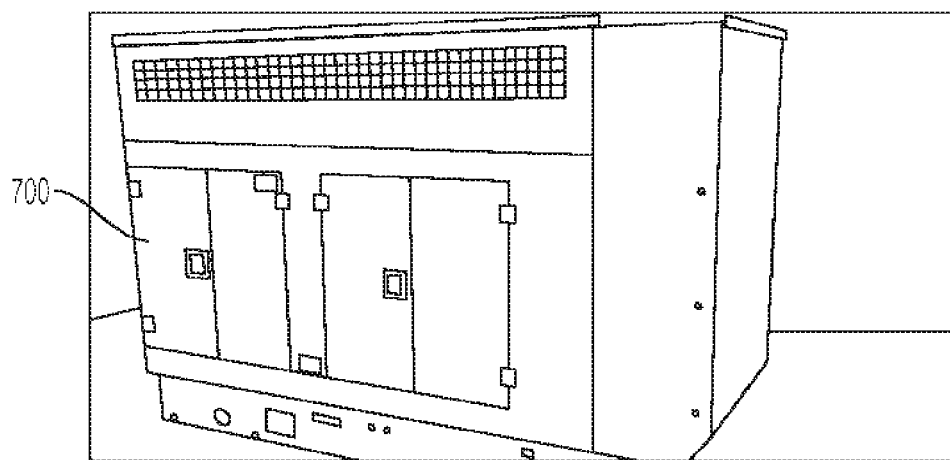
FIGS. 7 to 9 show AR content created for a generator, and displayed on a tablet computing device pointed at the generator.
Figure 8:
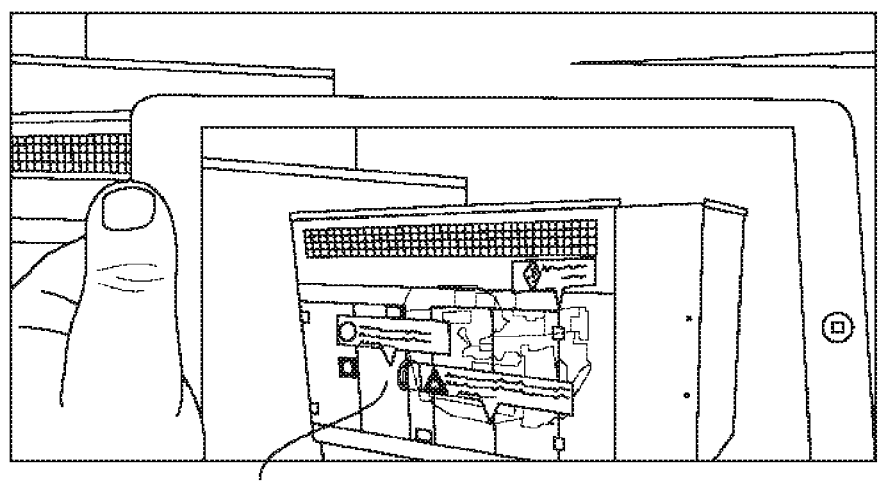
Figure 9:
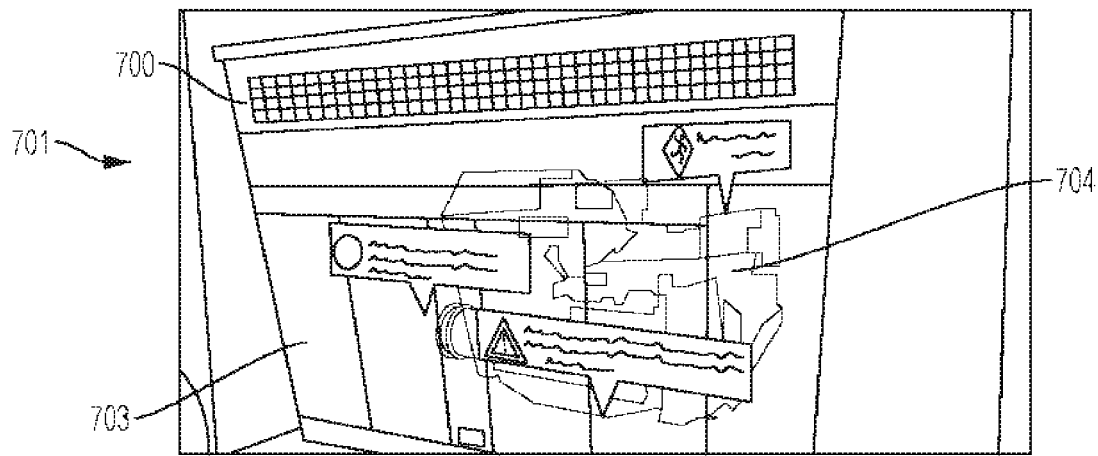

In some implementations, the computer graphics that form part of the AR content may overlay the same element shown in an actual graphic to enhance or explain an aspect of the element. In some implementations, the computer graphics do not overlay the element, but rather are adjacent to, or reference, the element. For example, text (part of a digital image) may not necessarily overlay parts of an image, but rather may be adjacent to parts relating to the text. In an example, FIGS. 7 to 9 show AR content 701 for a generator 700. The AR content, in the example of FIG. 9 includes an actual graphic 703 of the generator and computer-generated graphics 704 superimposed over parts of the actual graphic.

As noted, the AR content may be generated for an image or video. Thus, the AR content may be static (unchanging) or dynamic (changeable over time). In the case of video, features in frames of video may be identified using appropriate object identification and object tracking technique. The computer graphics portion of the AR content may track movement frame-by-frame of the actual device during playback of the video. The video may be real-time video, although that is not a requirement. In the case of real-time video, the DT may be generated or updated in real-time, and the resulting computer graphics superimposed on frames in real-time. Updating the DT may include changing the declarative model and/or the compiled model, and/or other data used to define the DT.

In some implementations, real-time may not mean simultaneous, but rather may include action that occurs on a continuous basis taking into account delays associated with processing, data transmission, hardware, and the like. For example, in the case of a bicycle, while that bicycle is being ridden, real-time video is captured. Sensor readings from sensors on the bicycle may be received by a computing device and incorporated, in real-time, into the DT for the bicycle, as described herein. The AR player renders appropriate computer graphics in the video that tracks movement of the device (e.g., the bicycle) in the video. An example of AR content generated during use of a bicycle is shown in FIGS. 10 to 14.

Figure 10:
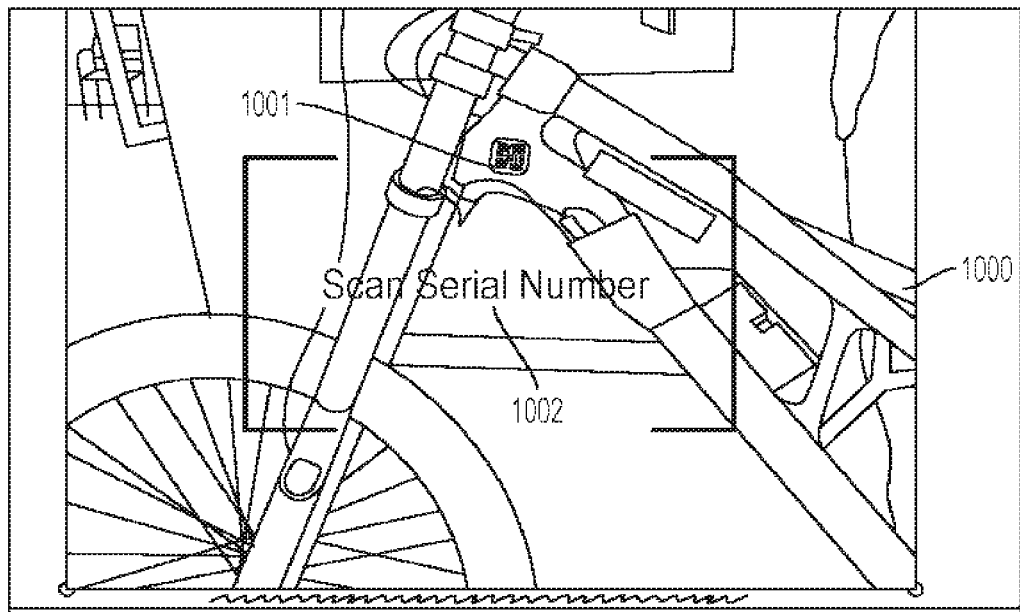
FIGS. 10 to 14 show AR content generated for a video of a bicycle.
Figure 11:
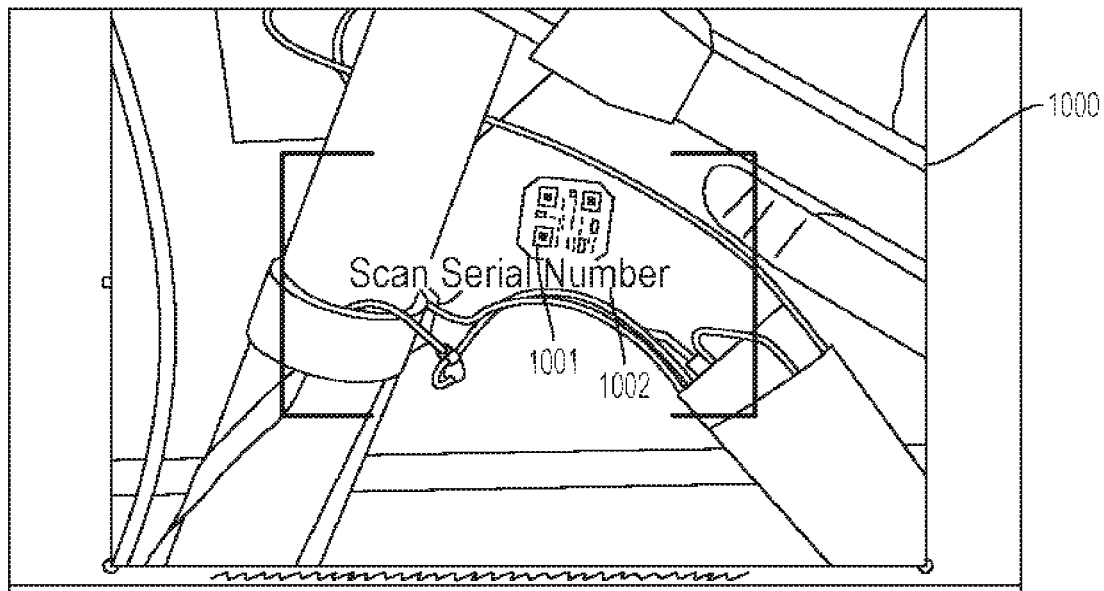
Figure 12:
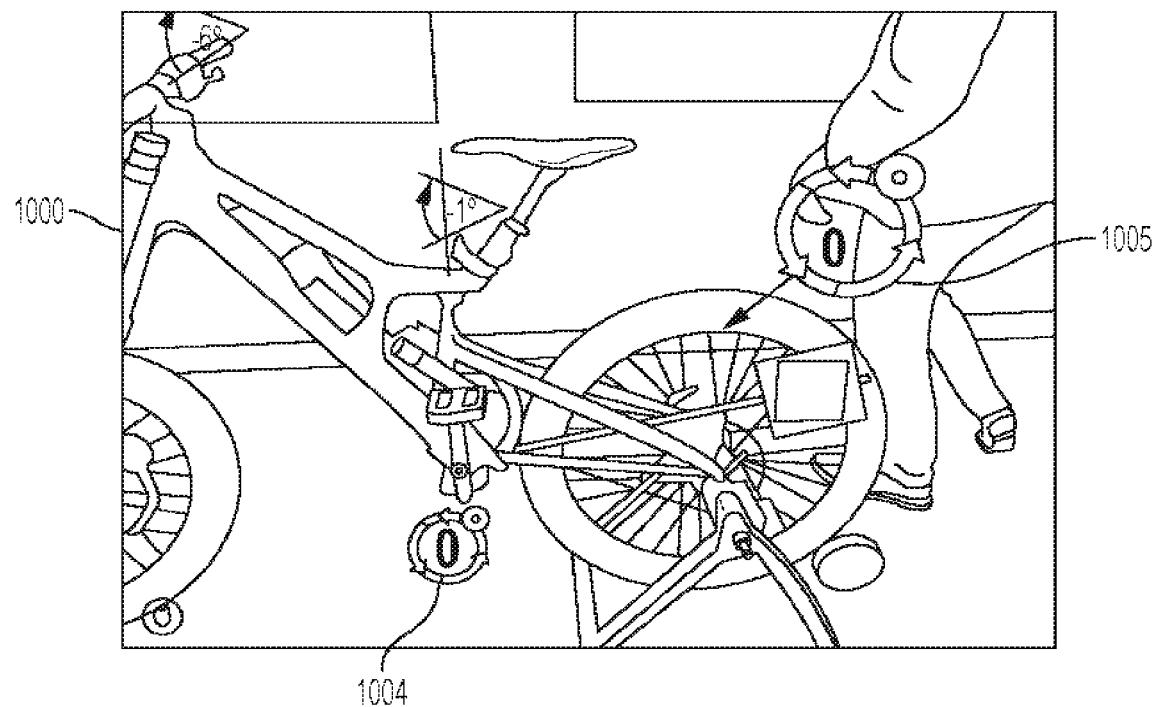
Figure 13:
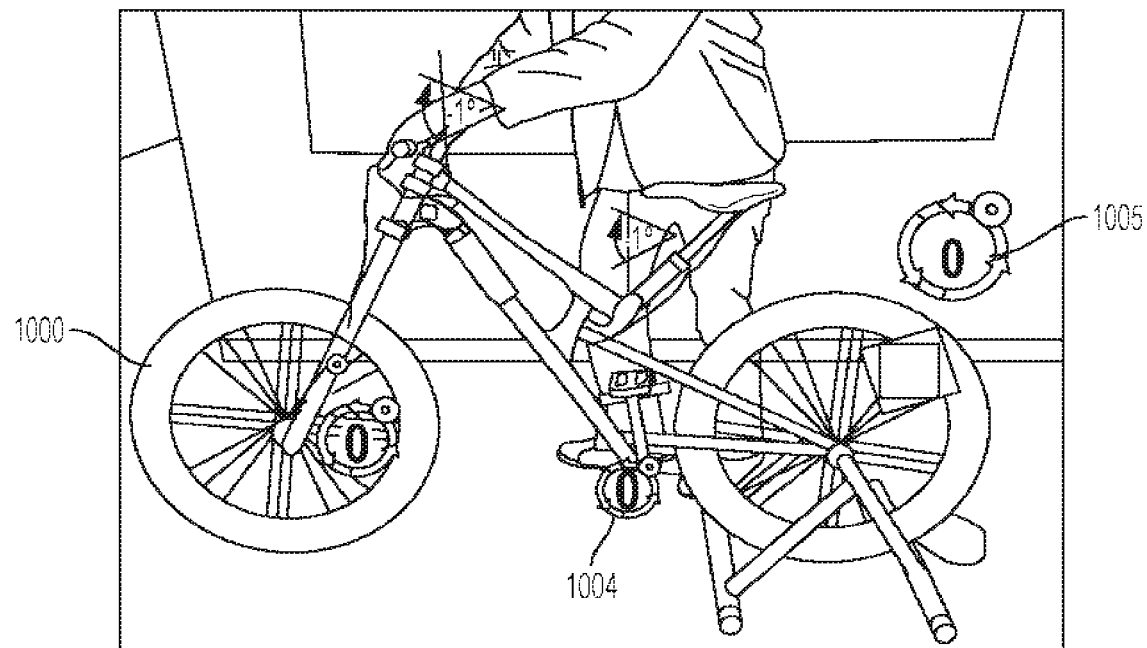
Figure 14:
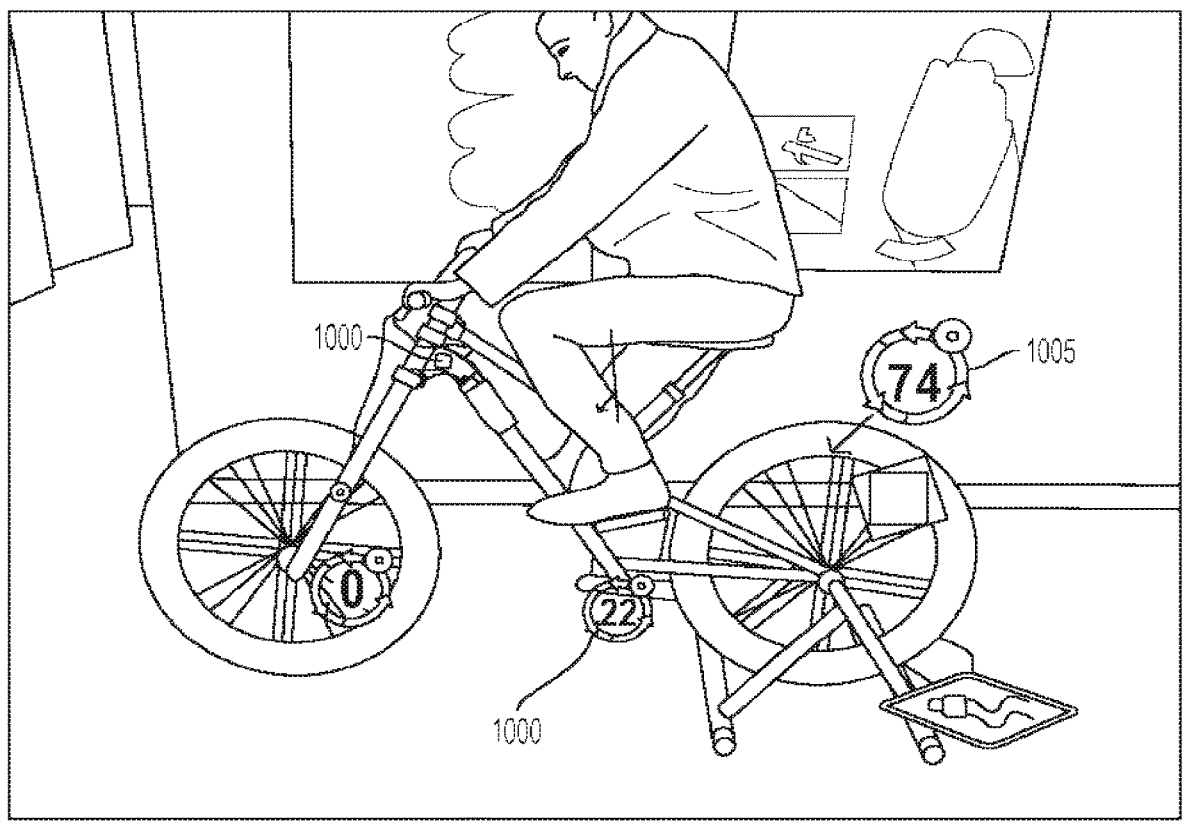
Figure 15:
FIGS. 15 to 18 show AR content generated for a video of a different bicycle.
Figure 16:
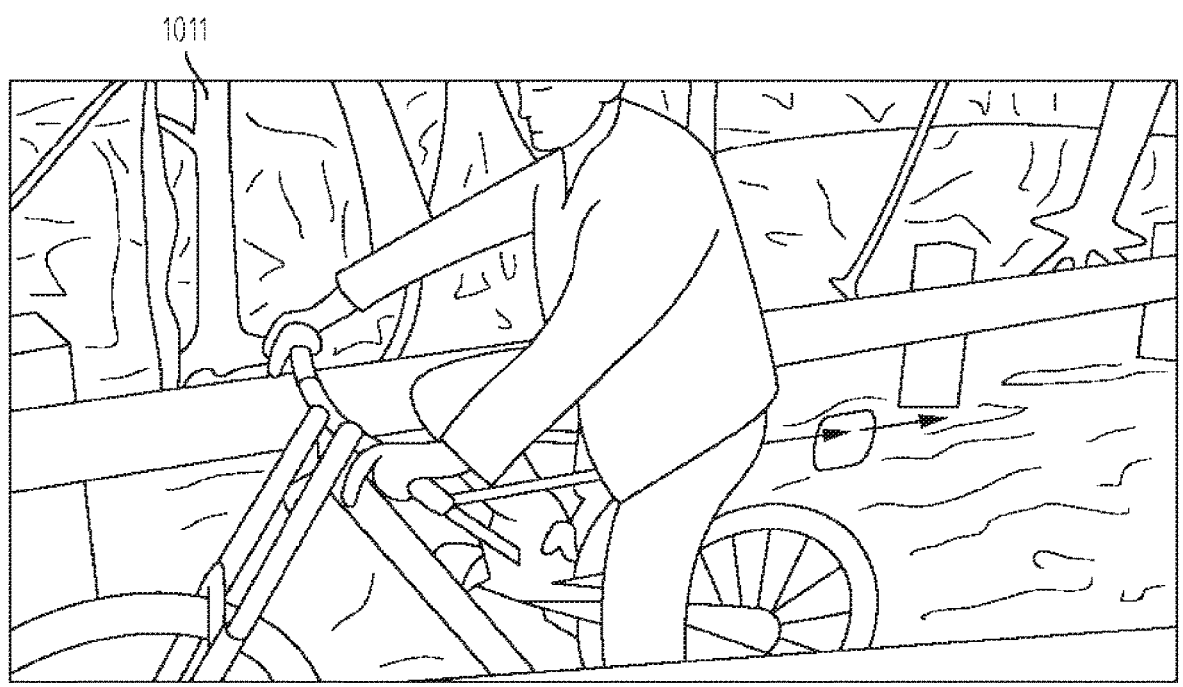

FIGS. 10 to 14 show an example of a bicycle 1000 having sensors deployed thereon. As shown in FIGS. 10 and 11, the instance of bicycle 1000 may be recognized by scanning the bicycle's serial number from QR code 1001. As described below, other techniques may be used in lieu of, or in addition to, the QR code scanning depicted in the figures to identify the instance of bicycle 1000. In this regard, FIGS. 10 and 11 show AR content 1002 ("Scan Serial Number") providing instructions on how to recognize bicycle 1000. Following recognition, information from the sensors is read by a computing devices, and is incorporated into a DT that defines the instance of the bicycle. Computer graphics that are based on information from the DT are generated and displayed on a display screen. As shown in FIGS. 12 to 14, the resulting AR content includes sensor readings 1004, 1005, and so forth that are superimposed on a video showing use of the bicycle 1000. As shown, sensor readings 1004 and 1005 change in real-time based on readings obtained for the sensors. The AR content may also depict the sensors at their appropriate locations, as shown.

If the foregoing AR content is generated on digital (AR) glasses, the computer graphics are not superimposed on video, but rather computer graphics are generated and displayed on the interior of the glasses' lenses to augment what the viewer is already seeing through the lenses.

The AR system may use information from the DT to determine the locations at which the sensor readings are to be displayed. In the case of a bicycle, for example, the AR system may query the DT for the bicycle to determine that the tires are 26 inches in diameter. The AR system may display a sensor reading for each tire at an appropriate location on an actual graphic (e.g., image or video) of the bicycle. For example, a reading may be positioned 14 inches from the axle of each tire, so that the reading is near to the tire, but does not overlap the tire. Similarly, if the tire is 15 inches in diameter, the AR system may query the DT for the bicycle so that the AR system knows to position the sensor reading at an 8 inch location from the axle rather than the 14 inch location of the larger tire.

In some implementations, the sensors may not all be actual sensors, but rather may include virtual sensors. A virtual sensor is not a physical sensor, but rather a sensor reading that is derived from readings of physical sensors or a computed value that is generated based on information other than readings of physical sensors. In the bicycle example, although there is no actual sensor for sensing the bicycle's center of gravity, that information can be derived from sensor readings taken from actual sensors on the bicycle. Accordingly, in the AR system, the bicycle has a virtual sensor for center of gravity. AR content generated for the bicycle may include computer graphics representing the virtual sensor and readings therefrom. The virtual sensor may be represented in the same manner as the physical sensors in the AR content, or it may include indicia (such as a marking) to distinguish it from the physical sensors.

Derived sensor readings can be defined as attributes of a model of a device, e.g. by annotating a function call. Like physical sensors, virtual sensors may have both inputs and outputs. A virtual sensor input, when rendered in the AR space, may be presented as a rotary dial or radio controls or perhaps some less skeuomorphic representation. On selecting a virtual sensor control in the AR space, a software function is called with an appropriate parameter value. The software function then returns a virtual sensor value, which may be displayed in the AR content. The look of the control may be defined in an AR editor suite, and the connection to the software may be handled in the AR player at runtime.

An aspect of the example AR system described herein involves use of a mobile device (e.g., smartphone, tablet, digital glasses, camera) to display AR content in real-time. For example, in an implementation, a user of a mobile device may capture a video of a device using the device's camera. An application (or "app") for the AR player on the mobile device may be executed to implement features of the AR system on the mobile device. In operation, the AR system may recognize an instance of a device that is the subject of an actual graphic, such as video, associate that instance with a corresponding DT, and generate AR content for display on the mobile device in real-time. During real-time operation, the DT of a device instance may be updated continuously based on changing sensor readings, and that updated DT may be used in generating the updated AR content. Example processes for updating the DT in real-time (e.g., continuously, as readings are received) are described herein.

Techniques may be implemented for using sensing mechanisms, such as a digital camera or GPS tracking, to recognize a specific instance of a device, and to automatically select a DT (e.g., a PLM configuration and associated CAD model(s)) associated with the device. For example, a device instance may be an intelligent device that includes a processor and some type of transmitter/receiver. In this case, the AR system may query the device for its identifying information. For example, if the AR system is implemented, in part, on an app on a mobile device, the app may query the device instance directly. If the device instance is on a network, and the AR system is implemented using a remote computing device, the remote computing device may query the device instance over the network. For devices that do not have sufficient intelligence to receive and respond to a query, information contained on the device, or the device itself, may be used to identify the device.

Any appropriate identifying information may be used that uniquely identifies the device. For example, the identifying information may be, or include, any combination of unique or semi-unique identifiers, such as a Bluetooth address, a media access control (MAC) address, an Internet Protocol (IP) address, a serial number, a quick response (QR) code or other type of bar code, a subnet address, a subscriber identification module (SIM), or the like. Tags, such as RFIDs, may be used for identification. For devices that do not move, the identifying information may be, or include, global positioning system (GPS) or other coordinates that defines the location of the device. For devices that do not include intelligence or other specific identifiers (like bar codes or readable serial numbers), unique features of the device may be used to identify the device instance. For example, a database may store information identifying markings, wear, damage, or other distinctive features of a device, together with a unique identifier for the device. A sensing mechanism (e.g., a camera) may capture an image of the device. The AR system may compare that image a stored image. Comparison may be performed on the mobile device or on a remote computer. The result of the comparison may identify the device.

Figure 17:
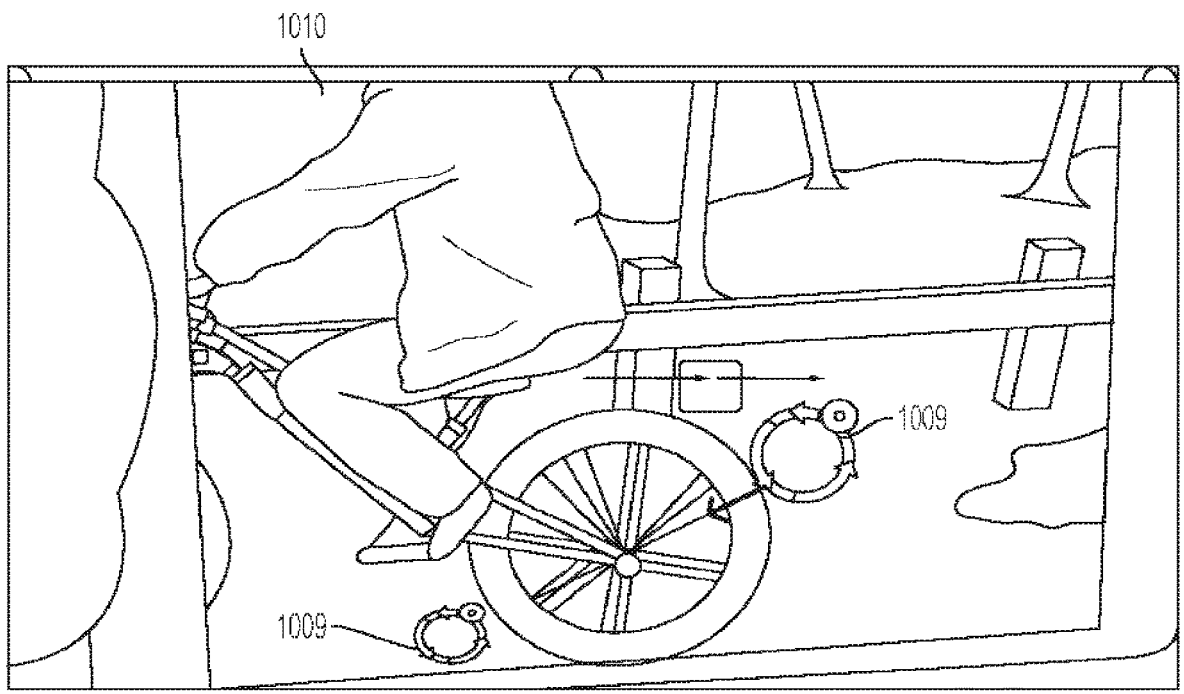
Figure 18:
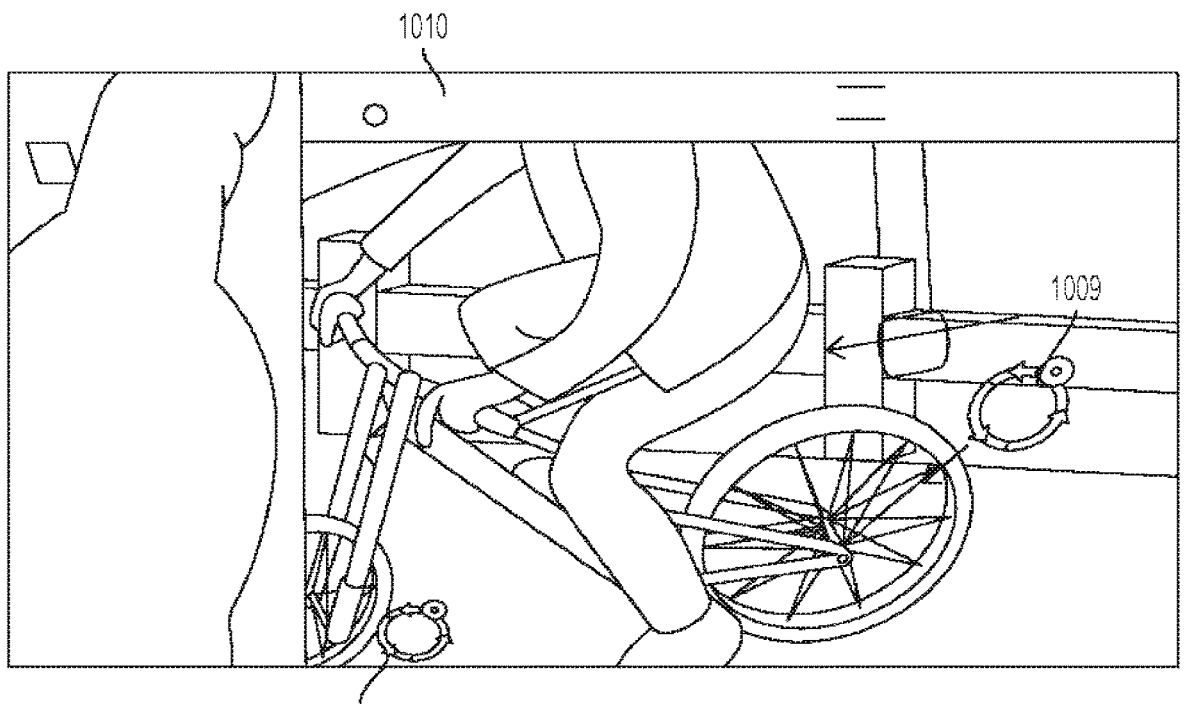

After the device is identified, the DT for that device may be selected (e.g., from memory, a location on a network, or elsewhere). The DT may be used in implementing the AR techniques described herein. In the bicycle example of FIGS. 15 to 18, a user may point their mobile device 1010 at the bicycle and an AR app on the mobile device may identify the instance of the bicycle as described herein. The app may then display video 1011 of the device using information from the DT for that instance of the device. For example, as shown in FIGS. 17 and 18, the AR system incorporates, into video displayed on the mobile device, sensor readings 1009 using computer graphics. As the video plays (e.g., as the bicycle is ridden), the system intermittently updates those sensor readings. The intermittent updates may be periodic (e.g., at set intervals), continuous, or at random times. Accordingly, by virtue of the example AR system described herein, Information, such as sensor readings, can be shown in the context of the systems, functions and components of a device within a graphical display of the device. In some implementations, the computer graphics may include a dashboard showing multiple readings relating to the device and/or controls for the device or sensors on the device.

AR may also be used to highlight specific components on the device, such as parts in need of replacement, or to display a virtual control panel or dashboard specific to the device to control, or otherwise affect, operation of the device. In some implementations, computer graphics may be incorporated into (e.g., superimposed onto) a graphic of a device in order to illustrate, graphically, textually, and/or through animation, how to perform maintenance, or otherwise interact with, the device. To this end, the AR system identifies an area of interest on the device. The area of interest may be based on a state of the device or component thereof and/or it may be based on a status of the user. Regarding the state of the device, the area of interest may include a part of the device that has malfunctioned. Regarding the status of the user, the area of interest may be an area to which the user has some interest or relationship. For example, if the user logs into the AR system as a technician, the system may know to identify parts of the device that require repair. That is, the technician may log into the system and, based on the technician's identity, the system may determine that the technician has a particular specialty. In that instance, the AR system may generate AR content showing, or other otherwise prominently featuring, only those components that relate to the technician's specialty. For example, if the technician's specialty is braking systems, the AR system may generate AR content showing, or other otherwise prominently featuring, only those components of a device instance that relate to its braking system.

Other information may also be used to by the AR system to identify an area of interest on the device. For example, a task to perform may be used to identify the area of interest. In the technician example above, if the technician's specialty is braking, but the technician is on step #4 of a procedure (and the AR system knows this), the AR system may highlight, or otherwise display in computer graphics, only the specific information or elements of a device that are relevant to step #4.

Figure 19:
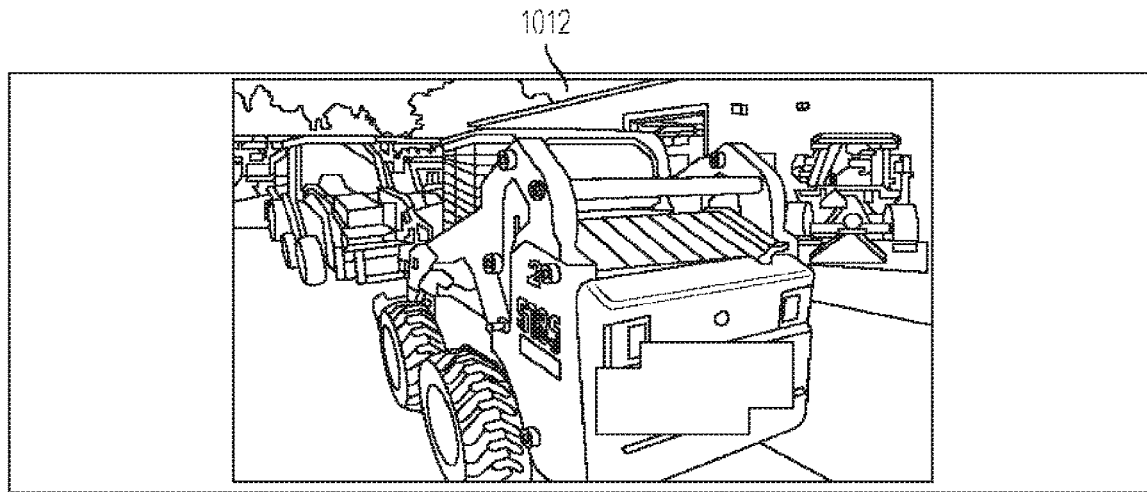
FIG. 19 shows an image of a loader.
Figure 20:
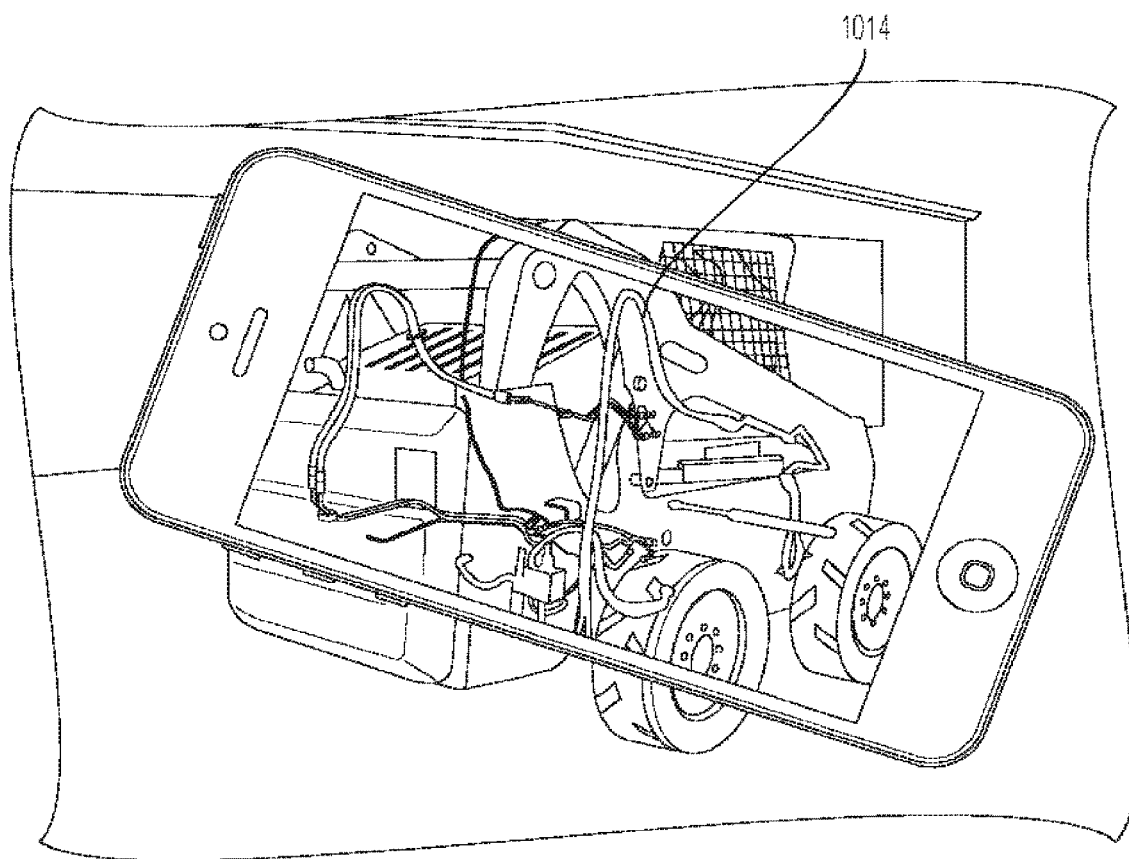
FIG. 20 shows AR content generated for the loader.

FIG. 19 shows an example of a loader 1012 to illustrate use of AR content to show how to perform maintenance on a device. The AR system identifies the instance of the loader using any appropriate technique, such as those described herein. In the example of FIG. 20, the AR system obtains the DT for the loader and uses the DT for the loader to generate computer graphic imagery 1014 to superimpose onto an image of the loader. In this example, the image of the loader is a "live" image of the loader viewed by a camera, glasses, or the like.

Figure 21:
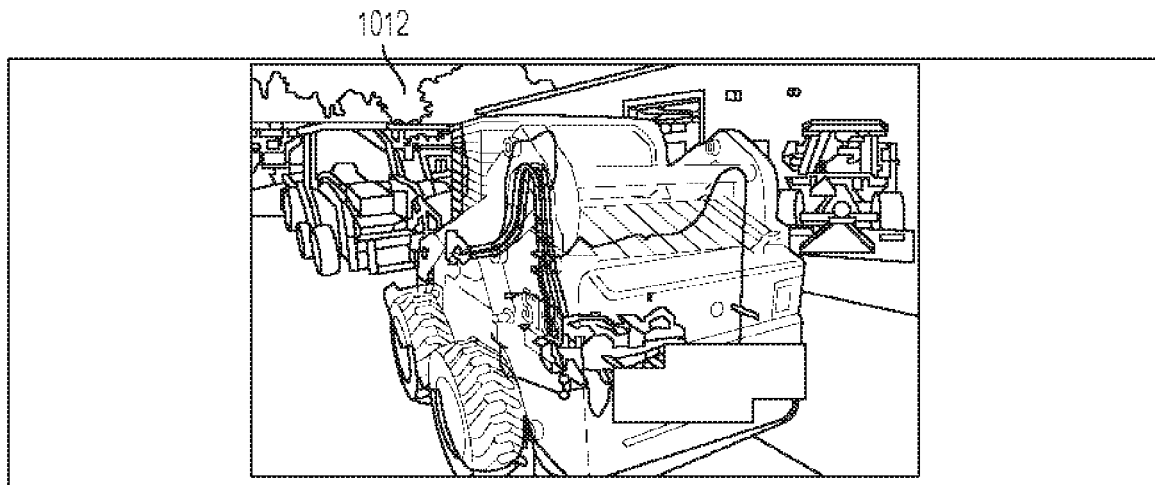
FIGS. 21 to 29 show AR content comprising frames of a computer-generated animation sequence illustrating how to perform an action on the loader.
Figure 22:
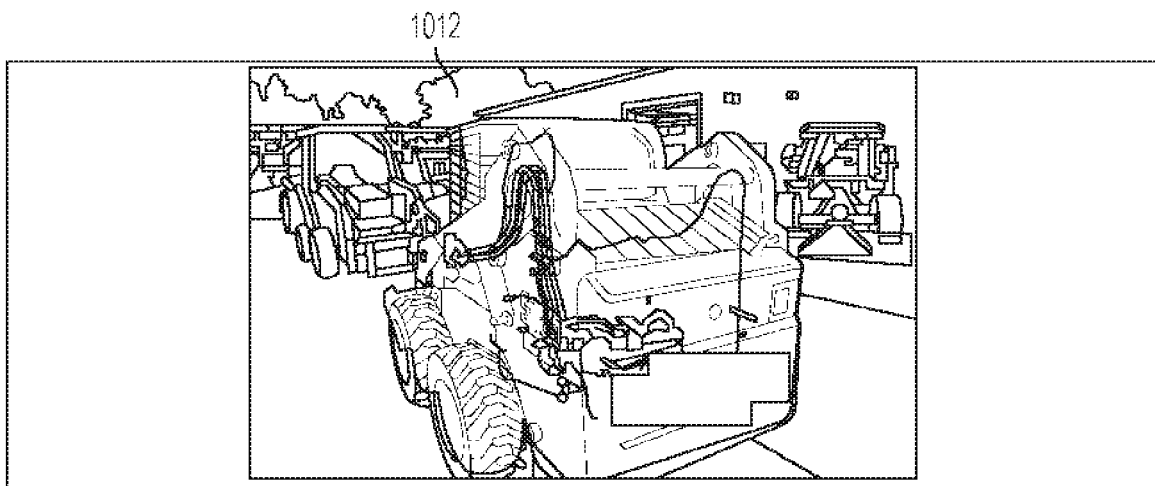
Figure 23:
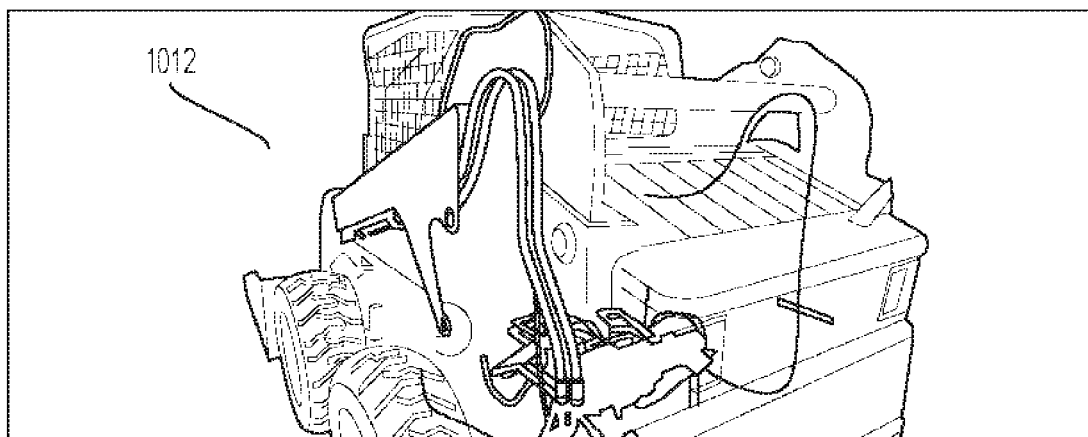
Figure 24:
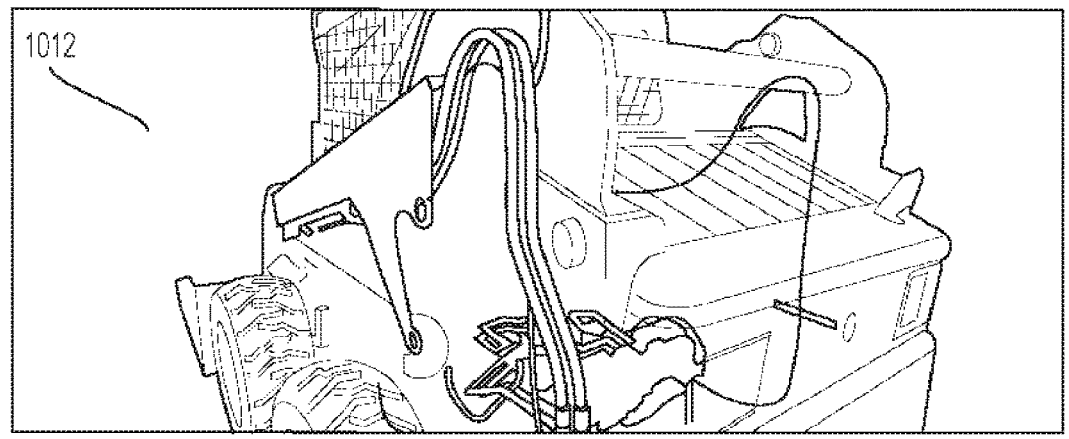
Figure 25:
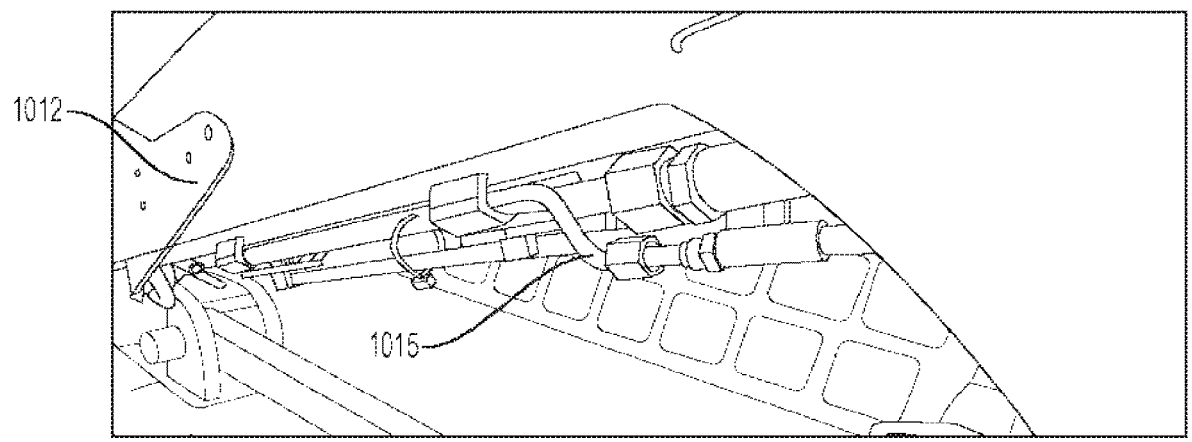
Figure 26:
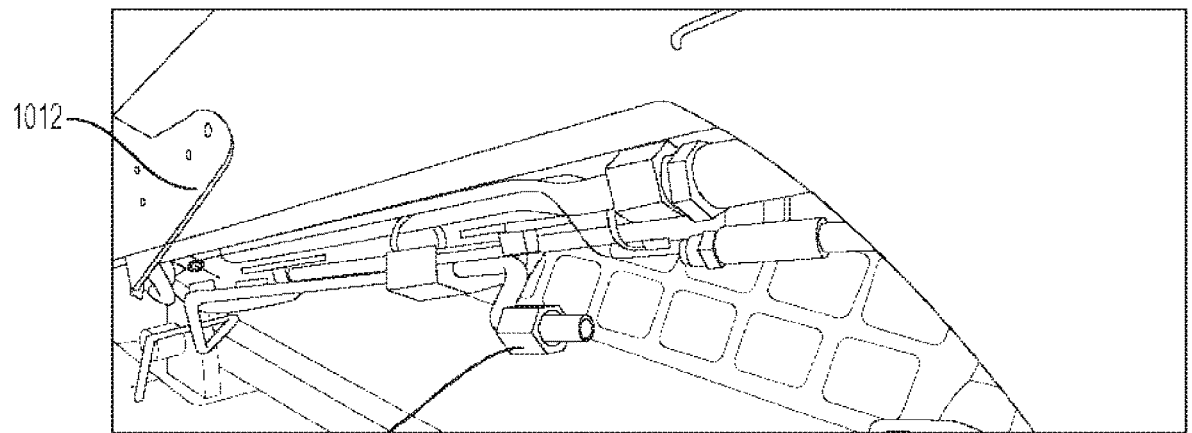
Figure 27:
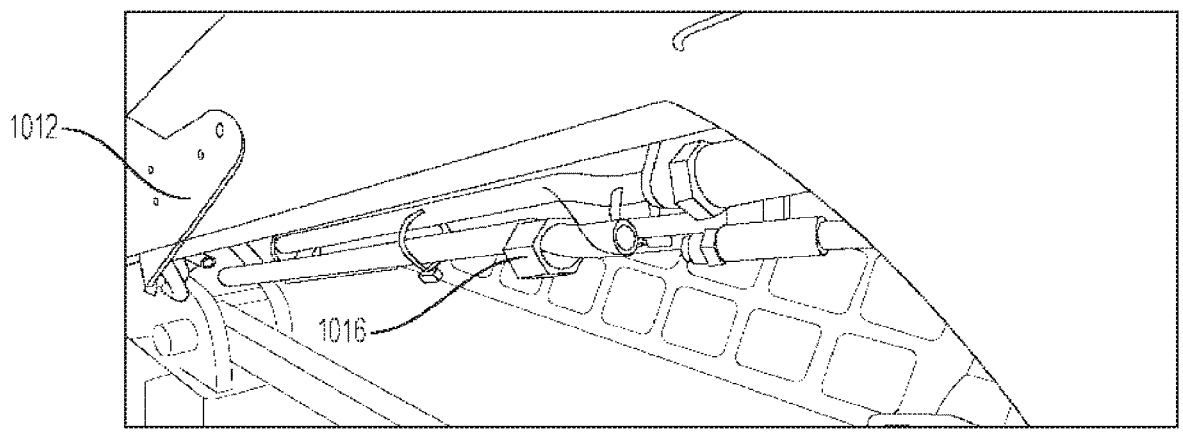
Figure 28:
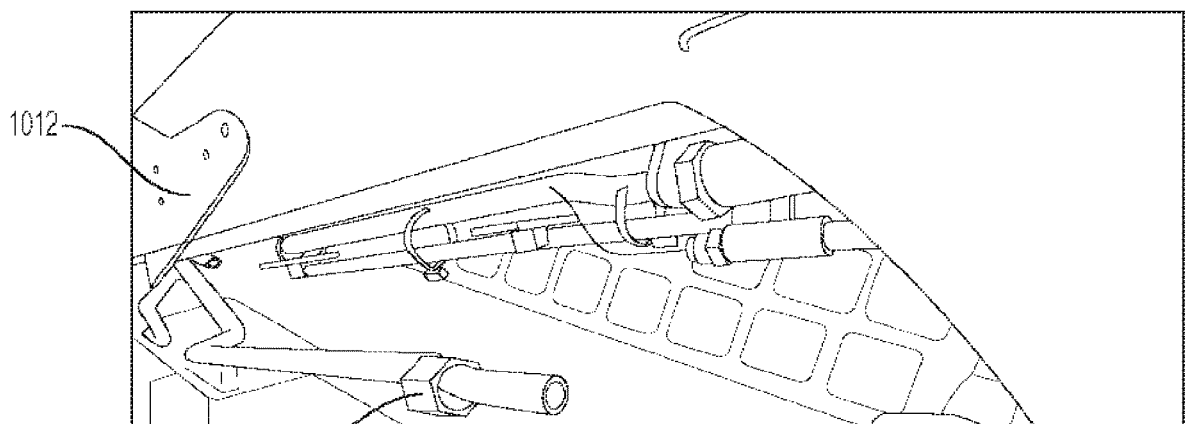
Figure 29:
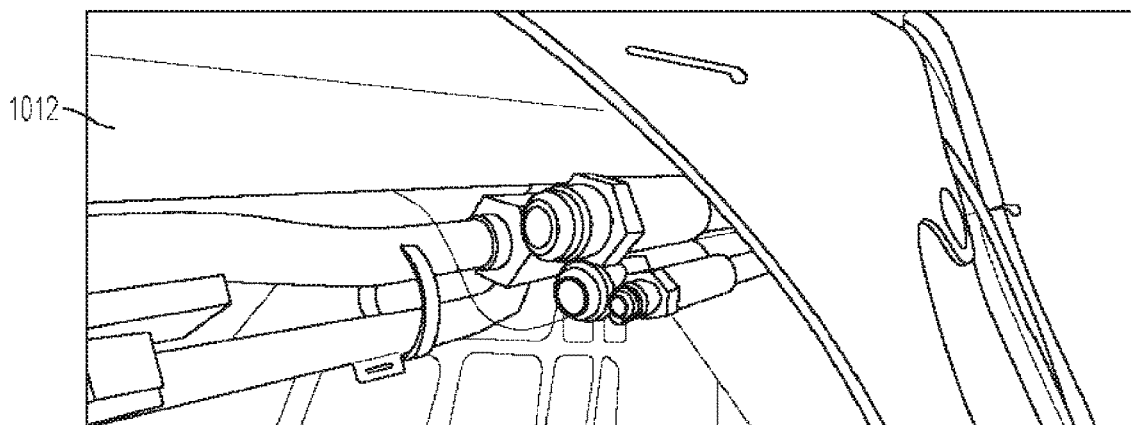

In the example of FIGS. 21 to 29, the AR system obtains the DT for the loader and uses the DT for the loader to generate computer graphic animation to superimpose onto an image of the loader. Any appropriate animation may be generated. In this example, the animation shows a guided, step-by-step process for removing conduits within the loader. Referring to FIG. 21, the animation begins at an image of the entire loader, and shows system-level components of the loader. The animation then focuses-in on the area of interest (FIG. 23). The animation includes step-by-step operations (of which FIGS. 25 to 28 are examples) showing how to remove conduits 1015 and 1016. As shown, at some point, the computer animation is displayed, but not the actual image. Since the DT for the loader includes information that models the loader in three dimensions (3D), the animation may enable viewing of the loader, and components thereof, from different angles, as shown in FIG. 29. Accordingly, different perspectives may be generated depending upon which is most appropriate for the task at hand. Although not shown in FIGS. 21 to 29, the animation may include textual instructions or computer-generated or recorded audio to enhance the guided service or repair experience (in this case, conduit removal). In the example of FIGS. 21 to 29, the AR content is generated on a mobile device; however, the AR content may be generated using any appropriate local and/or remote computing device(s).

The AR system generates the AR content in the loader example by linking information from the DT for the loader to features an actual graphic for the loader (which may be a live view of the loader). For example, the AR player may recognize features of the loader using the techniques described herein, interrogate the DT to identify information about those features and to identify locations of those same features on the actual graphic. In this example, the locations at which the animation is to begin, and the locations through which the animation is to proceed, are identified based on information in the DT. In some implementations, the actual graphic of the loader is tagged with semantic data that identifies visual elements that are used to identify and to lock onto physical elements in an AR scene. Accordingly, scene or frame annotations thus may be used identify where part-relative placement computer graphics is to occur.

As shown in the loader example, in some cases, only a specific area of a device may be of concern. Accordingly, in some implementations, the AR system may focus only on a specific area of a device, and generate AR content for that area only. In this regard, a device may contain numerous components, data sources, and potential scenarios in which some insights may be needed more than others. However, it is not always practical to create and to maintain, or possible to predict, a DT for all possible components, data sources, scenarios, or combinations thereof. Accordingly, in some implementations, the AR system or any other appropriate system, user, or process is configured to generate DTs on-demand and in real-time. Those DTs are generated only for subset(s) or systems of a device that are required to represent and to investigate a given scenario in a given context. So, for example, with a large system like an airplane, a DT can be generated for only a component of interest in the airplane, such as its left wing, and that DT may be used to generate AR content that relates only that component. In some cases, real-time, on-demand DTs are generated for an entire device as well.

In an example implementation, the AR system identifies a relevant component of the device that is needed to analyze a given scenario. This information can be obtained using any appropriate methods. For example, the information can be obtained directly from the device (e.g., by querying the device), where appropriate. This information can also be obtained from a remote management system, such as a CPM system, which may identify the relevant components in response to a query, appropriate analytical techniques, or combinations thereof. Even without a supporting system such as CPM, in some cases a front-end client, such as a tablet computer, digital (AR) glasses, or other connected mobile device, can provide the relevant data directly, including, e.g., identification information, CAD data, device sensor output data, and so forth. The AR system generates, in real-time, an ad-hoc DT that contains data for only aspects of the device that are relevant to the analysis at hand. For example, the DT may represent a part of the device proximate to the component and the component itself. Example processes for generating the DT are described herein. The AR system generates AR content for the aspects of the device that are relevant. The generated AR content may be part of a real-time (e.g., live) or recorded sequence, as described herein.

In different implementations, a local computing device (e.g., a front end device) is used to render AR content and a remote computing device (e.g., a back end device), if any included in the AR system, may each have different capabilities. The capabilities of these different devices may dictate where a DT, and thus AR content, is generated. For example, the DT and AR content may be generated locally; the DT and AR content may be generated remotely and only displayed locally; or the DT and AR content may be generated using a combination of local and remote processing resources. In some implementations, the local computing device may have no onboard sensing capability and be capable only of external monitoring; in some implementations, the local computing device may include basic onboard sensing and no processing capability; in some implementations, the local computing device may include onboard sensing and basic processing capability; and in some implementations, the local computing device may include onboard sensing and processing capability equivalent at least to that of a desktop computer. In some implementations, there may be no remote computing device, but rather only mobile-to-mobile device connection; in some implementations, the remote computing device may be capable of only signal exchange, but not processing; in some implementations, the remote computing device may be capable of device and data management, basic processing, and routing to integrated peripheral systems; and in some implementations, the remote computing device may be capable of advanced servicing and data processing.

Depending on the combined processing power of the local and remote computing devices in a given scenario, DT content can be populated on-demand without requiring significant amounts of provided/identified data. For example, a direct connection may exist between intelligent devices that include their own on-board processing resources and dataset to generate a digital representation. Using direct communication, such devices can create a DT locally, which can be used to analyze, on-demand, an interaction between devices. For example, an intelligent air pump may interact with an intelligent vehicle that has knowledge of its payload distribution and expected terrain conditions. The vehicle may communicate to the air pump an amount of air pressure to apply to each wheel to compensate for the payload and terrain. The DTs for both the air pump and the vehicle may be updated in real-time based on the interaction, e.g., to update the air pressure in the wheels of the vehicle DT and to update the use history of the air pump in the air pump's DT. DT updates may occur, e.g., via communications between processing devices on the intelligent devices and/or the AR system. In another example, a smart torque wrench may be in proximity to an airplane. A DT may be generated on-the-fly for a relevant portion of the airplane and for the smart torque wrench. Following use of the smart torque wrench on a bolt of the airplane, the DTs for both the airplane and torque wrench may be updated to reflect the use. For the airplane, its DT may specify the amount of torque of the bolt; and, for the torque wrench, its DT may specify that the wrench was used on the airplane and that it is now partially stripped, for example. In another example, a user holding a smart device can provide two relatively unintelligent devices the required on-demand computing resources to create a temporary DT and to provide insight in addition to what is read from the sensors. In still another example, a remote computing device, such as a server, may include most of the intelligence and processing resources in the AR system, enabling creation of an on-demand DT for identified device(s). For example, the remote computing device may track excavator arm linkages and thereby create an ad-hoc DT representing a subset assembly of the operating arm by processing equivalent CAD models of the identified items. The remote computing device may analyze the motion of that subset assembly and present expected operation results as part of AR content. In this example, excessive accelerations indicate weak damping, implying that damper oil may be leaking from a pump. Typically, AR content may be displayed on the local device or output to other AR clients.

Figure 30:
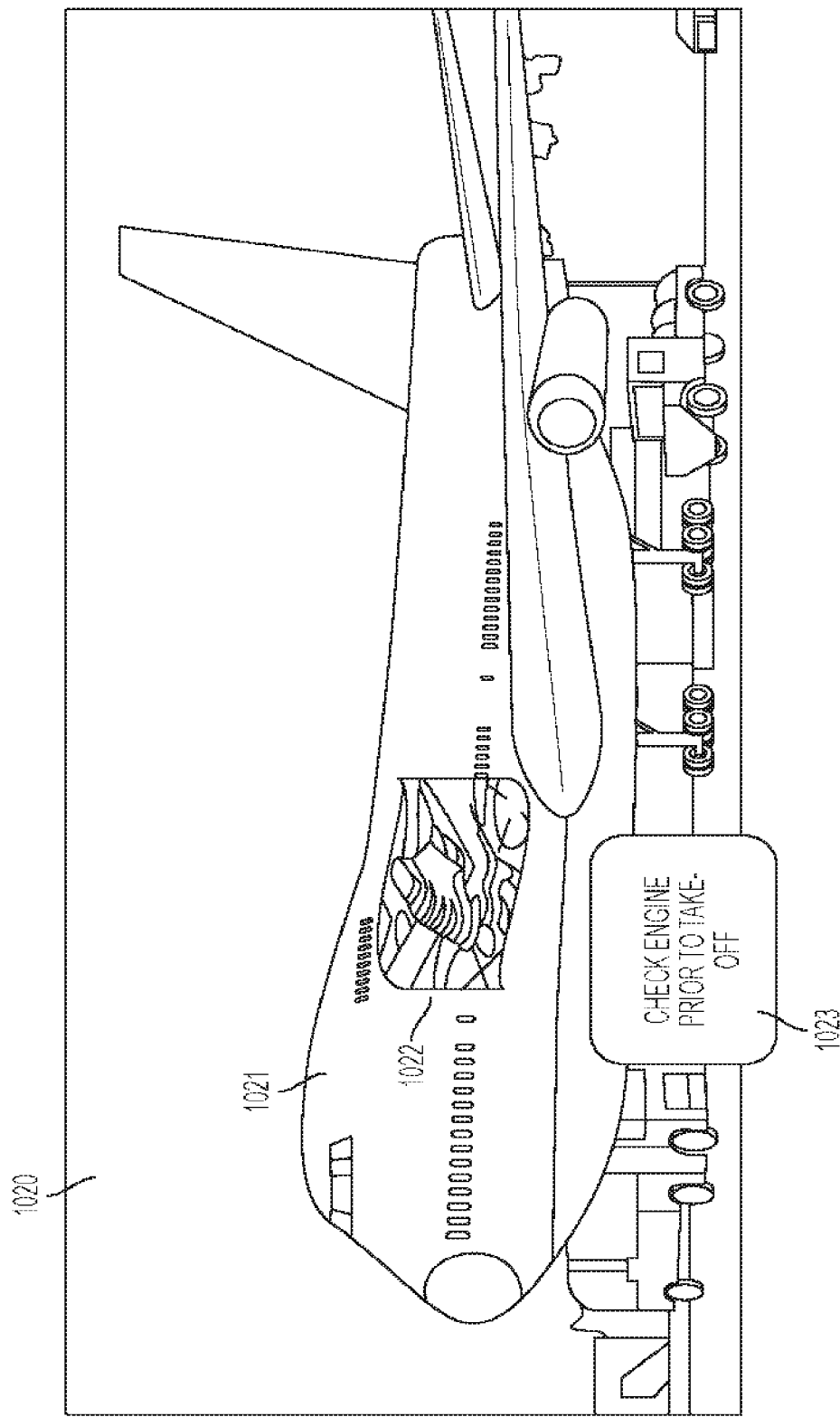
FIG. 30 shows AR content generated at a first distance from an airplane.
Figure 31:
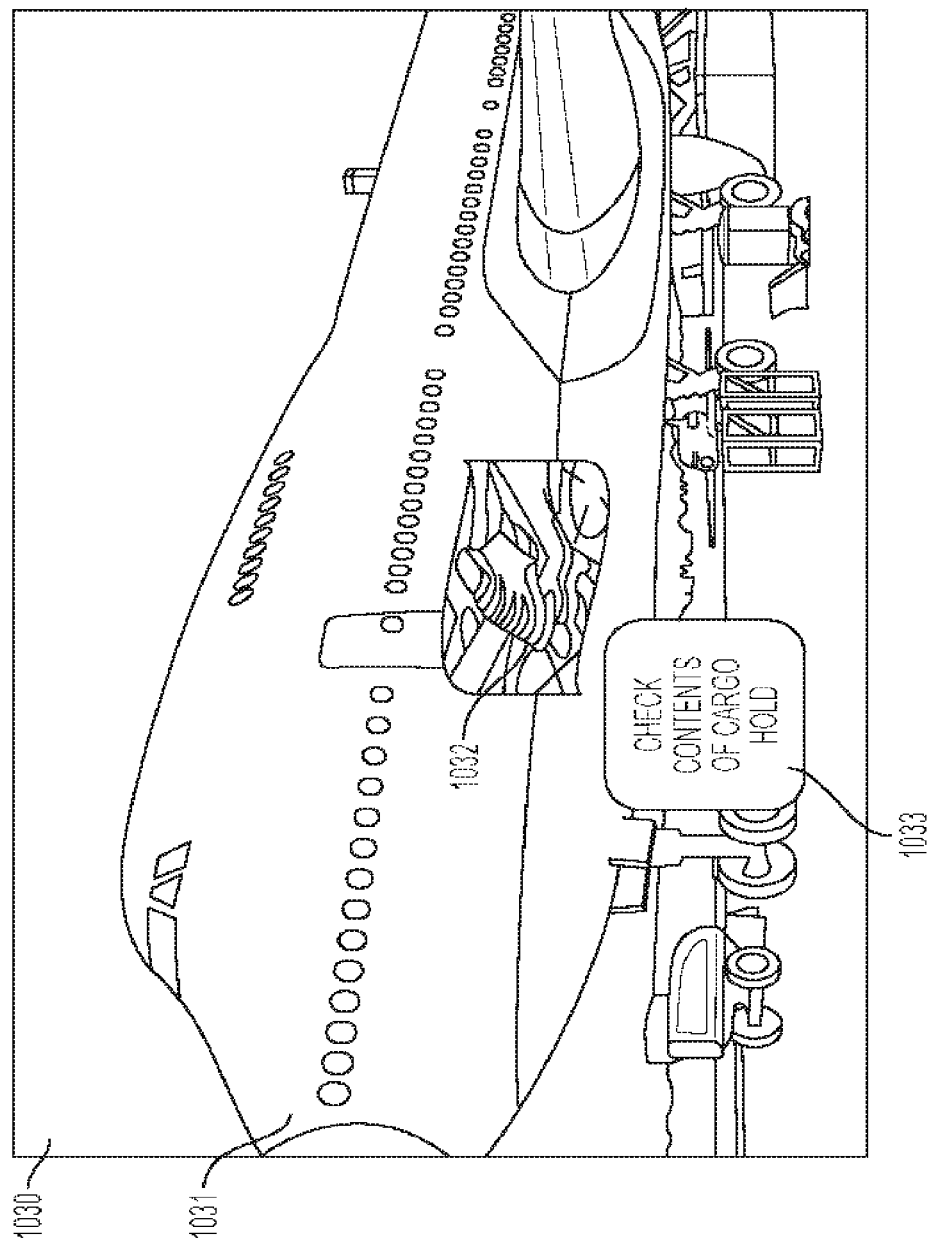
FIG. 31 shows AR content generated at a second distance from the airplane, where the second distance is less than the first distance.

In some implementations, the AR system can determine the relative position or proximity of a user to a device instance (a PT), and the AR system can adjust the level of detail of information presented on AR content based on the relative position or proximity. In some implementations, the relative position or proximity may be determined or inferred, from an image that is captured or it may be determined directly based on GPS or other signals that are indicative of the distance between the user and the device. In the airplane example above, if the user's mobile device captures a graphic (e.g., image or video) of a majority of the airplane, the AR system may infer that the user is far from the airplane and, therefore, the AR content generated by the AR system on the mobile device includes high-level information for the entire airplane. FIG. 30 shows an example of AR content 1020 that may be generated in this circumstance. The AR content in this example includes an actual image of an airplane 1021, a computer graphic 1022 showing internal components of the airplane at their appropriate locations, and textual instructions 1023 defining an action to be taken on the airplane. If user's mobile device captures or zooms-in on a part of the airplane, the AR system infers that the user is closer to the airplane and, in particular, close to that part. Therefore, the AR content that the system generates includes lower-level information for that part only, or at least for the part that is displayed. That lower-level information may be more detailed than the higher-level information, and may be specific to the part. For example, in FIG. 31, the user is closer to the airplane than in FIG. 30, and has captured an image close to the airplane's cargo hold. Accordingly, the AR content 1030 generated relates specifically to the cargo hold, in this example. The AR content in this example includes an actual image of an airplane 1031, a computer graphic 1032 showing internal components of the airplane at their appropriate locations, and textual instructions 1033 defining an action to be taken on the airplane. The AR content may be generated using any of the example processes described herein.

In some implementations, display of the AR content is dynamic. For example, as the distance between the user and the device changes, the AR content may change. In an example, if a user is far away from an airplane, and the user's mobile device is able to capture an image of the entire airplane, the AR content may relate to the entire airplane. As the user moves closer to the airplane, and the image on the user's mobile device focuses-in on a particular area or part of the airplane, the AR content will change in real-time and also focus-in on that particular area or part. The converse occurs where the user starts close and moves further away.

In some implementations, proximity between two device instances can promote interaction between their DTs in the AR system. In the airplane example above, a torque wrench may be within a threshold proximity of a bolt on an airplane. That the two are in proximity may be determined based on a graphic captured, e.g., by a mobile device. For example, the graphic may show the torque wrench and airplane, and the instances thereof may be identified according to the example processes described herein. After data indicating the proximity of the two is incorporated in the DTs for the airplane and the torque wrench, through the AR system, the DT for the airplane can be used to specify, for the DT of the torque wrench, the amount by which to tighten the bolt. That is, the DT for the airplane includes information indicating how tightly the bolt is fixed to the airplane, and the manufacturer's specified tightness. By querying the DT for the airplane, the AR system can determine the difference between actual and specified tightness. The AR system then can incorporate, into the DT of the torque wrench, the amount by which the bolt should be tightened. This information may be displayed in AR content showing the torque wrench and the part of the airplane containing the bolt. If the torque wrench is used to tighten the bolt, the amount by which the bolt was tightened may be incorporated into the DT of the airplane by the AR system. Likewise, the DT for the torque wrench can be updated by the AR system to include this use in its use history, along with other appropriate information. In some implementations, communication between two intelligent devices can cause the DTs for those devices to be updated. In the example above, the torque wrench may communicate, to the airplane, that the torque wrench was used to tighten the bolt to a specified torque. This information may be received by the airplane and, from there, communicated to the AR system to update the airplane's DT. Accordingly, communications between intelligent devices may aid in keeping their DTs up-to-date.

Taking again the above torque wrench example, in some implementations, information about the torque and the bolt may originate from some other system, not technically the DT, but one that provides the same types of information for AR purposes. In an example implementation of this type, there may be three-way communication between, for example, a manufacturing system that specifies torqueing bolts to a specific value, element(s) of the AR system understanding that the wrench and the bolt should be torqued to the specific value, and the DT (e.g., for the wrench and/or device containing the bolt) actually recording what the torque was when it was completed. In some implementations, this could be done using the DT as a proxy for the manufacturing system. The AR system may know if the DT is providing the value or if some other system provides the value. In some implementations, the DT may be programmed with code so that the DT knows its identity and/or can discover from upstream systems what that identity is.

AR content may be used to invoke operations or commands within the AR system for a device instance. That is, AR content may be used to control an actual device, thereby replacing the traditional machine-human interface with an AR interface. Referring to the generator example of FIGS. 7 to 9, computer graphics may be incorporated into an actual graphic (an image) of the generator to produce AR content for the generator. The AR content may be displayed on a mobile device in response to capturing an image of the generator.

The computer graphics may represent controls, such as switches, knobs, keyboards, or the like, located on the interior or exterior of the generator. For example, the computer graphics may include a control panel that represents a physical control panel on the generator or in the interior of the generator. The computer graphics may include a virtual control panel comprising a computer-generated construct representing actual controls on or in the device, but that differs from a physical organization of the controls on the device. In this example, the virtual control panel may organize the controls in any appropriate manner, and its organization may be customized by a user of a device.

The controls may be used to enter commands, such as start, stop, reset, test, update, etc., to control operation of the generator. The AR content shows those controls, and where those controls are located on the generator. Functions associated with the controls are associated with corresponding elements of the computer graphics. For example, the computer graphics may include a start button. The AR system may link operation of the generator to the start button in the AR content such that touching the start button the AR content causes the generator to start. For example, the generator may be on a computer network. Control functions of the generator may be accessible over that network. The AR system may connect to the generator, and its control functions, over the computer network. The AR system may receive a receive a selection of an element on the AR content, match that selection to a corresponding control function on the generator based on a location of the selection on-screen, and instruct the generator, over the computer network, to implement that function. Accordingly, control over a physical device is implemented using AR content representing that physical device.

To summarize the above example, a user's mobile device may capture an image of the generator; AR content thereof may be generated and displayed on the mobile device; the mobile device may receive a selection of a control element depicted in the AR content; the selection may be transmitted to the AR system; and the AR system may control operation of the generator in accordance with the selection. As described herein, information about the generator may be used to update its DT, and thereby update information on the AR content, e.g., in real-time. Any appropriate controls or control functions may implemented using AR, and the techniques described herein are not limited to use with a generator, to controlling a static (e.g., non-movable) device, or to the particular control functions listed.

Data gathered via the AR system may be used for various purposes. For example, the data may be used to produce an "as-maintained" BOM. Generally, an as-maintained BOM reflects parts included in a most recent configuration of a device. In this regard, devices may be serviced from time-to-time, resulting in replacement of parts on those devices or inclusion of additional parts on the devices. Heretofore, it was required that technicians manually update a BOM for a device in order to keep the BOM up-to-date. Using the AR system described herein, maintenance of the BOM for a device instance can be automated, at least partially.

To this end, the AR system may recognize a device instance using any appropriate technique. The BOM of the device instance may be updated using information from the DT for the device instance. For example, the DT may include information about replacement parts for the device instance, such as their serial numbers, QR codes, and so forth. This information may be obtained using any appropriate techniques, including those described herein. Changes to parts may be detected by comparing differences in identifying information for original and replaced parts. For example, if the AR system detects that the serial number of a particular part has changed, the AR system will instruct that the BOM for the device be updated to reflect that one part has been replaced with another part.

Information about replaced parts may also be used to update the BOM. This information may include identifying information, such as that described herein (e.g., serial number), along with any other relevant information that has changed (e.g., differences in performance information, composition, and so forth). Such information may be obtained from any appropriate source based on the identifying information for the replaced parts. For example, the AR system may identify the serial number of a replaced tire on a bicycle. The AR system may obtain information about that tire, such as its size, tread, composition, or the like, from product specifications or other appropriate sources. That information may be incorporated into the DT for the bicycle automatically, along with identifying information for the replaced part.

In some implementations, the AR system may determine, from one or more other systems such as those described above, that a replacement part has been ordered for a device instance. The AR system may also detect that a technician is in proximity to the device instance based, e.g., on location monitoring software on the technician's mobile device, and that the technician has the replacement part. This information may trigger the AR system to update the device's DT and its BOM to reflect that the replacement part has been included in the device. In some implementations, the AR system may request confirmation from the technician or, if the device is intelligent, from the device itself, if such information is available.

In some implementations, the AR system may be used to generate 3D graphic designs, and corresponding DTs for those designs. For example, the AR system may connect to a PLM system or other appropriate system to obtain graphics. The graphics may be computer-generated 3D graphics, computer-generated two-dimensional (2D) graphics, actual graphics such as images or video, or any other appropriate type of graphic. The graphics may represent a space or device that can be reconfigured digitally. For example, the graphic may include a prototype stage of a vehicle cabin. Through interaction with the AR system, a user may add components to the vehicle cabin, adjust their positions, change their kinematic set-up, change their geometry, and so forth. For example, the AR system may display the graphic on a mobile device, along with a menu that enables the user to select components to incorporate into the display. The user may drag and drop, or otherwise position, the components on the display, and manipulate the components using any appropriate techniques.

At any appropriate point in the design process, using the AR system, the user can initiate a simulation of the reconfigured graphic for a given scenario. For example, the AR system may receive instructions, initiated by the user, to conduct a simulation of a current design under specified conditions. In the case of a vehicle cabin, the simulation may be over recorded loads from previous experiments using that cabin. In response, the AR system generates a DT for the design by incorporating information from DTs for the original graphic and for the components incorporated into the graphic by the AR system through user interaction. The resulting DT models the design, including its architectural and operational aspects. The AR system, or any other appropriate computer-based system, may use information from the DT to simulate the response of the design to specified stimuli, such as the recorded loads noted above. The response to these stimuli may be recorded in the DT, and reported to the user in real-time on their mobile device or other appropriate computing device. In some implementations, digital construct(s) other than a DT may be used to perform the simulation for the design.

When a design provides an appropriate response in the simulation, the AR system stores the manipulations performed in the AR context to produce the design. The manipulations may include, e.g., locations of components, identities of components, ordering of components, changes to component size or structure, and so forth. The AR system reports those manipulations to a CAD system and update/revise associative CAD models of the manipulated objects. The CAD system may use information about the manipulations and components in generating blueprints or other models for a buildable version of the design.

In some implementations, the AR system may be used to replay, through simulation, a historical account of a device based upon input from a user or device interaction. The replay can be streamed into the AR player or other appropriate audio/visual application. In some implementations, the AR system enables additional operations vis-à-vis the device, such as status checks, causality analyses, and diagnostic analysis. In an example implementation, one or more sensors on a device records telemetry information from the device, and records ambient and environmental conditions for the device. This information, along with other appropriate information, such as that described herein, is incorporated into the DT for the device. Changes to the DT over time, particularly with respect to telemetry and conditions, are retained, resulting in a historical record of the operation of the device. This information is stored, in association, with time and date information. Accordingly, when a malfunction of the device occurs, information about the conditions at the time of the malfunction can be obtained by querying the DT.

The system (e.g., via the AR player) enables selection of an identified time window of interest, and selection of specific data points of interest, or the selection of a previously recorded indicator of an event such as a malfunction. For example, the system may include one or more options that can be manipulated by the user to select a time of interest, a device of interest, and one or more components of the device. For example, the time of interest may include a time window during which a malfunction of the device occurred or may have occurred. The device of interest may be selected, and components in that device, particularly those relating to the malfunction, may be selected. The AR system generates, and presents, AR content for the device over the time of interest. For example, the AR system may generate an AR video showing operation of the device during the time of the malfunction, operation of the component(s) of interest during that malfunction, and the operating conditions (e.g., temperature, humidity levels, and the like) during that malfunction. For example, the temperature may be displayed in a computer graphic, and the component operation may be displayed using computer animation. The device itself, or portion(s) thereof, may be displayed as a real-world image or video.

By providing AR content of the type described above, the AR system may enable performance of diagnostics or the like to determine the cause of the malfunction. In some implementations, the information from the DT may be used to recreate the malfunction digitally, using computer graphics, thereby providing a user with additional insight into what actually occurred.

In some implementations, information from instances of devices having at least some features in common (e.g., type such as "bicycle", model, make, or the like) may be aggregated by the AR system. Information aggregated over time may be used to inform subsequent design decisions. For example, the performance of numerous instances of the same make and model of a device may be used to determine what effect design changes will have over various operating conditions. In the bicycle example used herein, information from numerous instances of a bicycle model may be aggregated over a period of time by the AR system. Because numerous instances of the same bicycle are used, information about a range of operating conditions is available. That information may be incorporated into, and obtained from, DTs for the various bicycle instances. The AR system may query those DTs for that information, and provide that information to a CAD (or other appropriate) computer-based design system. The CAD system may use the information from the DTs of various bicycle instances to inform a simulation of a new bicycle design, and to determine or to predict performance of that new design under the range of conditions for which information is available.

As explained, an app may be used to implement the AR player and/or other functionality in the AR system. The app is thus part of the AR system. In some implementations, the app is executable on a mobile device and enables different stake holders (including end consumers) to build customized AR experiences. The customized AR experiences may be built by executing operations including, but not limited to, navigating device DT information, capturing relevant information as AR widgets, and sharing custom AR views with other users.

The app may include tools or other controls to implement, on a mobile device, any appropriate functionality of the AR system described herein. For example, the app may include tools to recognize and track devices using available techniques, including, e.g., contour recognition based on device CAD data. The app may include tools to access the DT of a device through the AR system. The app may include tools to enable users to select parts from a BOM of a device (e.g., from the DT) directly in an AR view and to navigate to different types of available information about those parts using known web browsing techniques. In some implementations, operations to access information about parts in the BOM can also include navigating through different DT repositories, since individual parts can be managed by separate systems. Device CAD data may enable mapping between a selection of a part in AR view and location of information about that part online.

The app may include tools to enable selection and marking of available information to be incorporated into custom widgets, and to enable positioning of custom widgets in 3D space around the device parts. The widgets may be instructional and/or interactive. For example, widgets may be used to provide repair or operational instructions. Widgets may be selectable to obtain current sensor readings. Widgets may be added or deleted to either add or delete information relating to one or sensors to the augmented reality content. Generally, widgets may be added to provide any appropriate information and functionality. The app may include tools to receive, through a user interface, user-provided comments and mark-ups to AR content, to incorporate those comments and mark-ups into the AR content, and to allow the user to publish the result to social media or elsewhere online (e.g., on the Internet or an intranet).

Computing devices that may be used to implement all or part of the front end and/or back end of the AR system include various forms of digital computers, examples of which include, but are not limited to, laptops, desktops, workstations, personal digital assistants, servers, blade servers, mainframes, and other appropriate computers. Mobile devices that may be used to implement all or part of the front end and/or back end of the AR system include, but are not limited to, personal digital assistants, cellular telephones, smartphones, cameras and other similar computing devices. The computing devices described herein, their connections and relationships, and their functions, are meant to be examples only, and are not meant to limit implementations of the technology described and/or claimed.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen.

Each computing device, and computer programs executed thereon, may also be configured to accept voice commands, and to perform functions in response to such commands. For example, the process described herein may be initiated at a client, to the extent possible, via voice commands.

Elements of different embodiments described herein may be combined to form other embodiments not specifically set forth above. Elements may be left out of the processes, computer programs, user interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A method performed by one or more processing devices, the method comprising:
   obtaining a digital graphic of a device;
   reconfiguring the digital graphic of the device by incorporating one or more augmented reality (AR) components into the digital graphic to produce a digital graphic of a reconfigured device;
   generating a digital twin for the reconfigured device, the digital twin being unique to the reconfigured device, where the digital twin is generated based on a digital twin for the device and one or more digital twins for one or more of the AR components, respectively;
   simulating operation of the reconfigured device using the digital twin for the reconfigured device; and
   generating an output for display showing the operation of the reconfigured device.

2. The method of claim 1, wherein reconfiguring the digital graphic of the device comprises at least one of: adjusting a position of a component of the device in the digital graphic of the device, changing a geometry of the device in the digital graphic of the device, or changing a kinematic characteristic of the device in the digital graphic of the device.

3. The method of claim 1, further comprising:
   receiving specified conditions associated with a simulation of operation of the reconfigured device;
   wherein simulating operation of the reconfigured device is performed for the specified conditions.

4. The method of claim 1, further comprising:
   receiving information for one or more stimuli;
   wherein simulating operation of the reconfigured device is performed in a presence of the one or more stimuli.

5. The method of claim 4, further comprising:
   recording a response of the reconfigured device to the one or more stimuli in the digital twin for the reconfigured device.

6. The method of claim 4, further comprising:
   reporting, in real-time, a response of the reconfigured device to the one or more stimuli.

7. The method of claim 1, further comprising:
   storing information about manipulations performed to reconfigure the digital graphic of the device; and
   reporting the manipulations to a third-party system configured to generate a blueprint or model for building the reconfigured device.

8. One or more non-transitory machine-readable storage media storing instructions that are executable by one or more processing devices to perform operations comprising:
   obtaining a digital graphic of a device;
   reconfiguring the digital graphic of the device by incorporating one or more augmented reality (AR) components into the digital graphic to produce a digital graphic of a reconfigured device;
   generating a digital twin for the reconfigured device, the digital twin being unique to the reconfigured device, where the digital twin is generated based on a digital twin for the device and one or more digital twins for one or more of the AR components, respectively;
   simulating operation of the reconfigured device using the digital twin for the reconfigured device; and
   generating an output for display showing the operation of the reconfigured device.

9. The one or more non-transitory machine-readable storage media of claim 8, wherein reconfiguring the digital graphic of the device comprises at least one of:
   adjusting a position of a component of the device in the digital graphic of the device, changing a geometry of the device in the digital graphic of the device, or changing a kinematic characteristic of the device in the digital graphic of the device.

10. The one or more non-transitory machine-readable storage media of claim 8, wherein the operations comprise:
    receiving specified conditions associated with a simulation of operation of the reconfigured device;
    wherein simulating operation of the reconfigured device is performed for the specified conditions.

11. The one or more non-transitory machine-readable storage media of claim 8, wherein the operations comprise:
    receiving information for one or more stimuli;
    wherein simulating operation of the reconfigured device is performed in a presence of the one or more stimuli.

12. The one or more non-transitory machine-readable storage media of claim 11, wherein the operations comprise:
    recording a response of the reconfigured device to the one or more stimuli in the digital twin for the reconfigured device.

13. The one or more non-transitory machine-readable storage media of claim 11, wherein the operations comprise:
    reporting, in real-time, a response of the reconfigured device to the one or more stimuli.

14. The one or more non-transitory machine-readable storage media of claim 8, wherein the operations comprise:
    storing information about manipulations performed to reconfigure the digital graphic of the device; and
    reporting the manipulations to a third-party system configured to generate a blueprint or model for building the reconfigured device.

15. A system comprising:
    one or more non-transitory machine-readable storage media storing instructions that are executable; and
    one or more processing devices to execute the instructions to perform operations comprising:
    obtaining a digital graphic of a device;
    reconfiguring the digital graphic of the device by incorporating one or more augmented reality (AR) components into the digital graphic to produce a digital graphic of a reconfigured device;
    generating a digital twin for the reconfigured device, the digital twin being unique to the reconfigured device, where the digital twin is generated based on a digital twin for the device and one or more digital twins for one or more of the AR components, respectively;
    simulating operation of the reconfigured device using the digital twin for the reconfigured device; and
    generating an output for display showing the operation of the reconfigured device.

16. The system of claim 15, wherein reconfiguring the digital graphic of the device comprises at least one of: adjusting a position of a component of the device in the digital graphic of the device, changing a geometry of the device in the digital graphic of the device, or changing a kinematic characteristic of the device in the digital graphic of the device.

17. The system of claim 15, wherein the operations comprise:
receiving specified conditions associated with a simulation of operation of the reconfigured device;
wherein simulating operation of the reconfigured device is performed for the specified conditions.

18. The system of claim 15, wherein the operations comprise:
receiving information for one or more stimuli;
wherein simulating operation of the reconfigured device is performed in a presence of the one or more stimuli.

19. The system of claim 18, wherein the operations comprise:
recording a response of the reconfigured device to the one or more stimuli in the digital twin for the reconfigured device.

20. The system of claim 18, wherein the operations comprise:
reporting, in real-time, a response of the reconfigured device to the one or more stimuli.

\* \* \* \* \*